United States Patent
Tanaka

(10) Patent No.: US 8,841,398 B2
(45) Date of Patent: Sep. 23, 2014

(54) SOLID TITANIUM CATALYST COMPONENT, OLEFIN POLYMERIZATION CATALYST, AND PROCESS FOR PRODUCING OLEFIN POLYMER

(75) Inventor: Tooru Tanaka, Yokohama (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 48 days.

(21) Appl. No.: 12/851,919

(22) Filed: Aug. 6, 2010

(65) Prior Publication Data

US 2010/0298517 A1 Nov. 25, 2010

Related U.S. Application Data

(62) Division of application No. 11/667,680, filed as application No. PCT/JP2005/021059 on Nov. 16, 2005.

(30) Foreign Application Priority Data

Nov. 17, 2004 (JP) ................................ 2004-332672

(51) Int. Cl.
| | | |
|---|---|---|
| *C08F 10/14* | (2006.01) | |
| *C08F 110/14* | (2006.01) | |
| *C08F 10/04* | (2006.01) | |
| *C08F 110/04* | (2006.01) | |
| *C08F 210/04* | (2006.01) | |
| *C08F 10/00* | (2006.01) | |
| *C08J 5/18* | (2006.01) | |
| *C08F 210/14* | (2006.01) | |

(52) U.S. Cl.
CPC ............... *C08F 10/00* (2013.01); *C08F 210/14* (2013.01); *C08J 5/18* (2013.01); *C08J 2323/20* (2013.01)
USPC .................... 526/348.4; 526/348.2; 526/348.6

(58) Field of Classification Search
CPC ...... C08F 10/14; C08F 110/14; C08F 210/14; C08F 10/04; C08F 110/04; C08F 210/04
USPC .................................. 526/348.2, 348.4, 348.6
See application file for complete search history.

(56) References Cited

U.S. PATENT DOCUMENTS

| | | | |
|---|---|---|---|
| 4,978,648 A | 12/1990 | Barbe et al. | |
| 5,422,401 A | 6/1995 | Kan et al. | |
| 5,476,911 A | 12/1995 | Morini et al. | |
| 6,395,670 B1 | 5/2002 | Morini et al. | |
| 2003/0008163 A1* | 1/2003 | Nakahara et al. | 428/516 |
| 2004/0048738 A1 | 3/2004 | Collina et al. | |
| 2005/0239636 A1 | 10/2005 | Gao et al. | |
| 2006/0105190 A1 | 5/2006 | Nishijima et al. | |
| 2008/0004412 A1 | 1/2008 | Matsumoto et al. | |
| 2010/0324239 A1 | 12/2010 | Matsumoto et al. | |

FOREIGN PATENT DOCUMENTS

| | | | |
|---|---|---|---|
| EP | 0045975 A2 | 2/1982 | |
| EP | 0362705 A2 | 4/1990 | |
| EP | 0622380 A1 | 11/1994 | |
| EP | 719800 A1 | 7/1996 | |
| EP | 1616689 A1 | 1/2006 | |
| JP | 57-063310 A | 4/1982 | |
| JP | 58-083006 A | 5/1983 | |
| JP | 61-113604 A | 5/1986 | |
| JP | 62-079208 A | 4/1987 | |
| JP | 2-32106 A | 2/1990 | |
| JP | 03-000706 A | 1/1991 | |
| JP | 4-202437 A | 7/1992 | |
| JP | 04-218508 A | 8/1992 | |
| JP | 6-322043 | 11/1994 | |
| JP | 7-145098 A | 6/1995 | |
| JP | 8-073524 A | 3/1996 | |
| JP | 8-231631 A | 9/1996 | |
| JP | 9-71613 A | 3/1997 | |
| JP | 2001-114810 A | 4/2001 | |
| JP | 2001-172408 A | 6/2001 | |
| JP | 2001-200015 A | 7/2001 | |
| JP | 2001-354714 A | 12/2001 | |
| JP | 2002-509578 A | 3/2002 | |
| JP | 2003-001772 A | 1/2003 | |
| JP | 2003-105022 A * | 4/2003 | ............. C08F 4/654 |
| JP | 2003105022 A * | 4/2003 | ............. C08F 4/654 |
| JP | 2004-521181 A | 7/2004 | |
| WO | WO 02/100904 A1 | 12/2002 | |
| WO | WO 03/068828 A1 | 8/2003 | |

OTHER PUBLICATIONS

English translation of JP 2003105022.*
Office Action issued on May 15, 2012, in corresponding Japanese Patent Application No. 2006-545106.
Office Action issued Nov. 12, 2013, in corresponding Japanese Patent Application No. 2012-148446.
Office Action issued Nov. 12, 2013, in corresponding Japanese Patent Application No. 2012-148447.

* cited by examiner

*Primary Examiner* — David W Wu
*Assistant Examiner* — Elizabeth Eng
(74) *Attorney, Agent, or Firm* — Buchanan, Ingersoll & Rooney PC

(57) ABSTRACT

The present invention provides a process for producing an α-olefin polymer comprising polymerizing or copolymerizing (a) $C_3$ or higher α-olefin(s) in the presence of an olefin polymerization catalyst comprising solid titanium catalyst component (I) containing titanium, magnesium, halogen, and a compound with a specific structure having two or more ether linkages and organometallic catalyst component (II) with high catalytic activity. In this process, particularly even in (co)polymerizing (a) higher olefin(s), demineralization is unnecessary. A 4-methyl-1-pentene-based polymer obtained by polymerization using the catalyst of the present invention is excellent in tacticity, transparency, heat resistance, and releasability, and the polymer is particularly suitable for a release film.

2 Claims, No Drawings

SOLID TITANIUM CATALYST COMPONENT, OLEFIN POLYMERIZATION CATALYST, AND PROCESS FOR PRODUCING OLEFIN POLYMER

This application is a Divisional Application of U.S. application Ser. No. 11/667,680 having a filing date of May 14, 2007, the entire disclosure of which is incorporated herein by reference, which is a National Stage of PCT International Application No. PCT/JP2005/021059 filed on Nov. 16, 2005, which claims priority from Japanese Patent Application No. 2004-332672 filed on Nov. 17, 2004, the entire disclosure of which is incorporated herein by reference.

FIELD OF THE INVENTION

The present invention relates to an olefin polymerization catalyst, a process for producing an α-olefin polymer, and a film obtained from the α-olefin polymer. Specifically, the present invention relates to a catalyst used for polymerizing or copolymerizing (a) $C_3$ or higher α-olefin(s), a process for producing the α-olefin polymer, and a film suitable as a release film.

BACKGROUND ART

As a catalyst used for producing olefin polymers such as homopolymers or copolymers of ethylene and/or α-olefins, catalysts containing a titanium compound loaded on activated magnesium halide have been known so far. As such olefin polymerization catalysts (hereinafter, "polymerization catalysts" may include copolymerization catalysts), there are known catalysts containing a solid titanium catalyst component composed of magnesium, titanium, halogen, and an electron donor and an organo aluminum compound.

These catalysts have high catalytic activity for polymerization of $C_3$ or higher α-olefins such as propylene and 1-butene and copolymerization of two or more monomers selected from such α-olefins, similarly to the case of ethylene polymerization. Further, the resulting copolymers have high melting points because of high tacticity and crystallinity. It is known that, among these catalysts, a catalyst containing a solid titanium catalyst component loading an electron donor selected from carboxylates including phthalates as typical examples, an alkyl aluminum, and a silicon compound having at least one Si—OR (wherein R is a hydrocarbon group) serving as cocatalysts exhibits particularly excellent performances (for example, Japanese Patent Laid-Open Publication No. S57-63310, Japanese Patent Laid-Open Publication No. S58-83006, etc.).

It is also disclosed that a catalyst containing a solid titanium catalyst component containing a compound with two or more ether linkages as an electron donor has high polymerization activity (for example, Japanese Patent Laid-Open Publication No. H3-706, Japanese Patent No. 3476793, Japanese Patent Laid-Open Publication No. H4-218508, Japanese Patent Laid-Open Publication No. 2003-105022, etc.).

DISCLOSURE OF THE INVENTION

Problems to be Solved by the Invention

The present invention was conducted in view of the above background art, having an object to provide a solid titanium catalyst component exhibiting high catalytic activity and stereospecificity for polymerization or copolymerization of monomers including (a) $C_3$ or higher α-olefin(s), an olefin polymerization catalyst, and a process for producing an olefin polymer. Another object of the present invention is to provide an α-olefin polymer that is obtained using the olefin polymerization catalyst and is excellent in tacticity, crystallinity, and transparency.

Means for Solving the Problems

The present inventors have intensively studied to solve the above problems and found that a catalyst formed from a solid titanium catalyst component containing a specific compound with a specific structure having two or more ether linkages as an electron donor and a specific organometallic catalyst component exhibits high catalytic activity and stereospecificity for polymerization or copolymerization of monomers including (a) $C_3$ or higher α-olefin(s), and that the specific α-olefin copolymer obtained using this catalyst satisfies a specific relation between the composition of the copolymer and the composition of its decane-soluble component, and that this copolymer is excellent in transparency and releasability when used for films. The present invention has been accomplished based on these findings.

Namely, the present invention provides a solid titanium catalyst component (I) containing titanium, magnesium, halogen, and a compound having two or more ether linkages interposed with plural atoms represented by general formula (1) below.

[Formula 1]

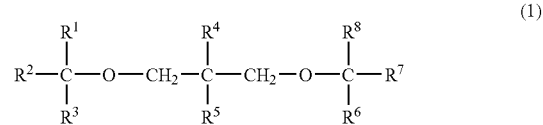

(1)

(In the formula, $R^1$, $R^3$, $R^6$, and $R^8$ are hydrogen atoms; $R^2$ is a methyl group; $R^7$ is a methyl group or hydrogen atom; each of $R^4$ and $R^5$ is an atom or group having at least one kind of element selected from carbon, hydrogen, oxygen, halogens, nitrogen, sulfur, phosphorus, boron, and silicon; and the total number of carbon atoms in $R^4$ and $R^5$ is 4 to 6.)

The present invention also provides an olefin polymerization catalyst containing the solid titanium catalyst component (I) and an organometallic catalyst component (II) containing a metal selected from the metals in Groups I to III.

The present invention also provides a process for producing an α-olefin polymer comprising polymerizing or copolymerizing (a) $C_3$ or higher α-olefin(s) in the presence of the above olefin polymerization catalyst.

The present invention also provides a 4-methyl-1-pentene copolymer that is a copolymer containing 80 to 99.9 mass % of structural units derived from 4-methyl-1-pentene and 0.1 to 20 mass % of structural units derived from at least one $C_{3-11}$ α-olefin except 4-methyl-1-pentene, wherein the ratio of the content of structural units derived from the $C_{3-11}$ α-olefin(s) except 4-methyl-1-pentene in the n-decane-soluble component of said copolymer, $a_1$ in mass %, to the content of structural units derived from the $C_{3-11}$ α-olefin(s) except 4-methyl-1-pentene in said copolymer, $b_1$ in mass %, ($a_1/b_1$) is in the range of 2.0 to 4.0; and a 4-methyl-1-pentene copolymer that is a copolymer containing 80 to 99.9 mass % of structural units derived from 4-methyl-1-pentene and 0.1 to 20 mass % of structural units derived from at least one $C_{12-20}$ α-olefin, wherein the ratio of the content of structural units derived from the $C_{12-20}$ α-olefin(s) in the n-decane soluble component of said copolymer, $a_2$ in mass %, to the content of structural units derived from the $C_{12-20}$ α-olefin(s) in said copolymer, $b_2$ in mass %, ($a_2/b_2$) is in the range of 3.0 to 6.0.

The present invention also provides a film comprising the above 4-methyl-1-pentene copolymer.

The present invention also provides a film obtained by forming a copolymer containing 80 to 99.9 mass % of structural units derived from 4-methyl-1-pentene and 0.1 to 20 mass % of structural units derived from at least one $C_{3-11}$ α-olefin except 4-methyl-1-pentene, wherein the ratio of the blocking factor of said film, $c_1$ in g/cm, to the content of structural units derived from the $C_{3-11}$ α-olefin(s) except 4-methyl-1-pentene in the n-decane-soluble component of said copolymer, $d_1$ in mol %, ($c_1/d_1$) is in the range of 0.1 to 1.5; and a film obtained by forming a copolymer containing 80 to 99.9 mass % of structural units derived from 4-methyl-1-pentene and 0.1 to 20 mass % of structural units derived from at least one $C_{12-20}$ α-olefin, wherein the ratio of the blocking factor of said film, $c_2$ in g/cm, to the content of structural units derived from the $C_{12-20}$ α-olefin(s) in the n-decane-soluble component of said copolymer, $d_2$ in mol %, ($c_2/d_2$) is in the range of 0.1 to 1.5.

The present invention also provides a release film comprising the above 4-methyl-1-pentene copolymer.

Effects of the Invention

The process for producing an α-olefin polymer according to the present invention is characterized in that (a) $C_3$ or higher α-olefin(s) is/are polymerized or copolymerized in the presence of an olefin polymerization catalyst comprising a solid titanium catalyst component (I) containing titanium, magnesium, halogen, and a compound having two or more ether linkages interposed with plural atoms represented by general formula (1) and an organometallic catalyst component (II) containing a metal selected from the metals in Groups I to III. The process for producing an α-olefin polymer according to the present invention can produce an α-olefin polymer having excellent tacticity, crystallinity, and transparency in high catalytic efficiency.

A film with excellent releasability can be also provided from the resin produced as above. Further, since the catalyst has a polymerization activity higher than that of conventional catalysts, demineralization step is unnecessary, and thereby the production cost of resins can be greatly reduced.

BEST MODE FOR CARRYING OUT THE INVENTION

The olefin polymerization catalyst and the process for producing an olefin polymer (polymer or copolymer) according to the present invention are specifically described below.
[Solid Titanium Catalyst Component (I)]

Solid titanium catalyst component (I) contained in the olefin polymerization catalyst of the present invention is generally prepared by contacting a magnesium compound and a titanium compound with a compound having two or more ether linkages represented by general formula (1).
<Magnesium Compound>

A magnesium compound may be used for preparing solid titanium catalyst component (I). The magnesium compound includes magnesium compounds having reducing ability and magnesium compounds having no reducing ability.

The magnesium compound having reducing ability includes, for example, organomagnesium compounds represented by general formula (2) below.

$$X_n MgR^9{}_{2-n} \qquad (2)$$

(In the formula, $0 \le n < 2$; $R^9$ is a hydrogen atom or a $C_{1-20}$ alkyl, aryl, or cycloalkyl group; two $R^9$s may be identical or different when n is 0; and X is a halogen atom.)

Such organomagnesium compounds having reducing ability include, specifically, dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, octylbutylmagnesium, butylmagnesium hydride, and the like. These magnesium compounds may be used alone or may form a complex with an organoaluminum compound described later. These magnesium compounds may be liquid or solid.

Specific examples of the magnesium compound having no reducing ability include magnesium halides such as magnesium chloride, magnesium bromide, magnesium iodide, and magnesium fluoride; alkoxymagnesium halides such as methoxymagnesium chloride, ethoxymagnesium chloride, isopropoxymagnesium chloride, butoxymagnesium chloride, and octyloxymagnesium chloride; aryloxymagnesium halides such as phenoxymagnesium chloride and methylphenoxymagnesium chloride; alkoxymagnesiums such as ethoxymagnesium, isopropoxymagnesium, butoxymagnesium, n-octyloxymagnesium, and 2-ethylhexyloxymagnesium; aryloxymagnesiums such as phenoxymagnesium and dimethylphenoxymagnesium; magnesium carboxylates such as magnesium laurate and magnesium stearate; and the like.

The magnesium compound having no reducing ability may be a compound derived from the above-described magnesium compound having reducing ability or a compound generated in preparing the catalyst component. The magnesium compound having no reducing ability can be generated from the magnesium compound having reducing ability, for example, by contacting the magnesium compound having reducing ability with a polysiloxane, halogen-containing compound, or compound having an OH group or labile carbon-oxygen bond such as halogen-containing silane, halogen-containing aluminum compound, ester, and alcohol.

Besides the magnesium compounds having reducing ability and magnesium compounds having no reducing ability, the magnesium compound may be a complex compound or double compound formed from the magnesium compound and another metal, or a mixture of the magnesium compound and another metal compound. Two or more of the magnesium compounds may be used in combination, and they may be used in either liquid or solid state. When the magnesium compound is solid, it may be liquefied with an alcohol, carboxylic acid, aldehyde, amine, metal acid ester, or the like.

Of these, preferably used are magnesium compounds having no reducing ability, especially halogen-containing magnesium compounds. Of the halogen-containing magnesium compounds, further preferred are magnesium chloride, alkoxymagnesium chlorides, and aryloxymagnesium chlorides.
<Titanium Compound>

As the titanium compound used in preparing solid titanium catalyst component (I) contained in the catalyst used in the process for producing the α-olefin polymer according to the present invention, desirable are liquid titanium compounds, which include, for example, tetravalent titanium compounds represented by the following general formula.

$$Ti(OR^{10})_g X_{4-g} \quad (3)$$

($R^{10}$ is a hydrocarbon group; X is a halogen atom; and $0 \leq g \leq 4$.)

More specifically, the titanium compound includes titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(O\text{-}n\text{-}C_4H_9)Cl_3$, $Ti(OC_2H_5)Br_3$, and $Ti(OCH_2C(CH_3)_2)Br_3$; alkoxytitanium dihalides such as $Ti(OCH_3)_2Cl_2$, $Ti(OC_2H_5)_2Cl_2$, $Ti(O\text{-}n\text{-}C_4H_9)_2Cl_2$, and $Ti(OC_2H_5)_2Br_2$; alkoxytitanium-monohalides such as $Ti(OCH_3)_3Cl$, $Ti(OC_2H_5)_3Cl$, $Ti(O\text{-}n\text{-}C_4H_9)_3Cl$, and $Ti(OC_2H_5)_3Br$; and tetraalkoxytitaniums such as $Ti(OCH_3)_4$, $Ti(OC_2H_5)_4$, $Ti(O\text{-}n\text{-}C_4H_9)_4$, $Ti(OCH_2C(CH_3)_2)_4$, tetra(2-ethylhexyloxy)titanium, and tetra(2-ethylhexyloxy)titanium.

Among these, titanium tetrahalides are preferred, and titanium tetrachloride is particularly preferred. These titanium compounds may be used singly or as a mixture thereof and may be diluted with a hydrocarbon or halogenated hydrocarbon for use.

<Compound Represented by General Formula (1)>

In preparing solid titanium catalyst component (I) contained in the catalyst used in the present invention, besides the above compounds, there is used a compound having two or more ether linkages interposed with plural atoms represented by general formula (1).

The compound having two or more ether linkages used in preparing solid titanium catalyst component (I) is represented by general formula (1) below.

[Formula 2]

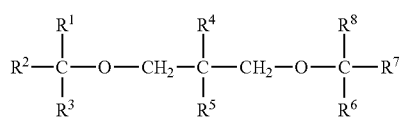
(1)

(In the formula, $R^1$, $R^3$, $R^6$, and $R^8$ are hydrogen atoms; $R^2$ is a methyl group; $R^7$ is a methyl group or hydrogen atom; each of $R^4$ and $R^5$ is an atom or group having at least one kind of element selected from carbon, hydrogen, oxygen, halogens, nitrogen, sulfur, phosphorus, boron, and silicon; and the total number of carbon atoms in $R^4$ and $R^5$ is 4 to 6.)

As the compound having two or more ether linkages, preferred are compounds in which $R^4$ and $R^5$ in general formula (1) are $C_{1-4}$ hydrocarbon groups and the total number of carbon atoms in $R^4$ and $R^5$ is 4 to 6. More preferred are compounds in which $R^4$ and $R^5$ in general formula (1) are $C_{1-4}$ hydrocarbon groups and the total number of carbon atoms in $R^4$ and $R^5$ is 4 to 5. As the $C_{1-4}$ hydrocarbon group, preferred are methyl, ethyl, n-propyl, isopropyl, n-butyl, isobutyl, and tert-butyl. Particularly preferred are methyl, ethyl, n-propyl, and n-butyl.

Such compounds having two or more ether linkages include, specifically, 2-methyl-2-n-propyldiethoxypropane, 2-methyl-2-isopropyldiethoxypropane, 2-methyl-n-butyldiethoxypropane, 2,2-diethyl-1,3-diethoxypropane, 2-ethyl-2-n-propyldiethoxypropane, 2-ethyl-2-isopropyldiethoxypropane, 2,2-di-n-propyldiethoxypropane, and the like. Particularly preferred are 2-methyl-2-n-propyl-1,3-diethoxypropane and 2,2-diethyl-1,3-diethoxypropane.

<Other Components>

Solid titanium catalyst component (I) used in preparing the polymerization catalyst may be prepared by using, besides the above components, other components conventionally used for solid titanium catalyst components, as long as the objective of the present invention is not impaired. Such components include, for example, catalyst supports and reaction auxiliaries such as organic and inorganic compounds containing silicon, phosphorus, aluminum, electron donor (III) described later, and the like.

As the catalyst support used are $Al_2O_3$, $SiO_2$, $B_2O_3$, MgO, CaO, $TiO_2$, ZnO, $ZnO_2$, $SnO_2$, BaO, ThO, resins such as styrene/divinylbenzene copolymer, and the like. Among these, preferred are $Al_2O_3$, $SiO_2$, and styrene/divinylbenzene copolymer. The ether represented by general formula (1) or electron donor (III) is not necessarily supplied as starting materials. They may be generated during preparation of solid titanium catalyst component (I).

Examples of electron donor (III) include organic acid esters, organic acid halides, organic acid anhydrides, ethers, ketones, tertiary amines, phosphite esters, phosphate esters, phosphoramides, carboxamides, nitriles, and the like. Specifically, there may be mentioned, $C_{3-15}$ ketones such as acetone, methyl ethyl ketone, methyl isobutyl ketone, acetophenone, benzophenone, cyclohexanone, and benzoquinone; $C_{2-15}$ aldehydes such as acetaldehyde, propionaldehyde, octylaldehyde, benzaldehyde, tolualdehyde, and naphthaldehyde; $C_{2-18}$ organic acid esters such as methyl formate, methyl acetate, ethyl acetate, vinyl acetate, propyl acetate, octyl acetate, cyclohexyl acetate, ethyl propionate, methyl lactate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumalin, phthalide, and ethylene carbonate; $C_{2-15}$ acid halides such as acetyl chloride, benzoyl chloride, toluyl chloride, and anisyl chloride; $C_{2-20}$ ethers such as methyl ether, ethyl ether, isopropyl ether, butyl ether, amyl ether, tetrahydrofuran, anisole, and diphenyl ether; acid amides such as N,N-dimethylacetamide, N,N-diethylbenzamide, and N,N-dimethyltoluamide; tertiary amines such as trimethylamine, triethylamine, tributylamine, tribenzylamine, and tetramethylethylenediamine; and nitriles such as acetonitrile, benzonitrile, and tolunitrile. Among these, aromatic carboxylates are preferred. Two or more of these compounds may be used in combination. The organic acid esters also include polycarboxylic esters as particularly preferred examples.

<Method for Preparing Solid Titanium Catalyst Component (I)>

Solid titanium catalyst component (I) contained in the polymerization catalyst used in the process according to the present invention is prepared, for example, by contacting the above magnesium compound, liquid titanium compound, and compound having two or more ether linkages, and optionally, the catalyst support, electron donor (III), and the like. There is no particular limitation on the method for preparing solid titanium catalyst component (I) using these compounds. Brief explanation will be given with several examples below.

1) A method of contacting a magnesium compound, a compound having two or more ether linkages represented by general formula (1), and a titanium compound in any order to react. In this reaction, each component may be pretreated with the compound having two or more ether linkages and/or electron donor (I) or a reaction auxiliary such as organoaluminum compound and halogen-containing silicon compound.

2) A method of reacting a liquid magnesium compound having no reducing ability and a liquid titanium compound in the presence of a compound having two or more ether linkages represented by general formula (1) to precipitate a solid magnesium-titanium complex.

3) A method of further reacting the reaction product obtained in Method 2) with a titanium compound.

4) A method of further reacting the reaction product obtained in Method 1) or 2) with an ether represented by general formula (1) and a titanium compound.

5) A method of pulverizing a magnesium compound, a compound having two or more ether linkages represented by general formula (1), and a titanium compound to form solid, which is then treated with halogen, a halogen-containing compound, or an aromatic hydrocarbon. This method may include a step of pulverizing only the magnesium compound, a step of pulverizing the magnesium compound and compound having two or more ether linkages represented by general formula (1), or a step of pulverizing the magnesium compound and titanium compound. These compounds may be pulverized in the presence of a pulverization auxiliary or the like. Further, the pulverization may be followed by pre-treatment with a reaction auxiliary before the treatment with halogen or the like. The reaction auxiliary includes organoaluminum compounds, halogen-containing silicon compounds, and the like.

6) A method of treating the product obtained in Methods 1) to 4) with halogen, a halogen-containing compound, or an aromatic hydrocarbon.

7) A method of contacting a catalyst support such as metal oxide, organomagnesium compound, and halogen-containing compound followed by contacting the product with a compound having two or more ether linkages represented by general formula (1) and a titanium compound.

8) A method of contacting a magnesium compound such as organic acid magnesium salt, alkoxymagnesium, and aryloxymagnesium with a compound having two or more ether linkages represented by general formula (1), a titanium compound, and optionally a halogen-containing compound.

9) A method of reacting a solution containing at least a magnesium compound and an alkoxytitanium with a titanium compound, a compound having two or more ether linkages represented by general formula (1), and optionally a halogen-containing compound such as halogen-containing silicon compound.

10) A method of reacting a liquid magnesium compound having no reducing ability and an organoaluminum compound to precipitate a solid magnesium-aluminum complex, which is then reacted with a compound having two or more ether linkages represented by general formula (1) and a titanium compound.

Solid titanium catalyst component (I) containing the compound represented by general formula (1) is obtained by such methods.

In preparing solid titanium catalyst component (I) by such methods, for the magnesium compound, the liquid titanium compound, and the compound having two or more ether linkages represented by general formula (1), their amounts to be used depend on the compounds, the conditions for contact, the order of contact, and the like. The amount, used per mole of magnesium atoms, of the compound having two or more ether linkages represented by general formula (1) is preferably 0.01 moles to 5 moles, and particularly preferably 0.05 moles to 1 mole, while that of the liquid titanium compound is preferably 0.1 moles to 1000 moles, and particularly preferably 1 mole to 200 moles.

The temperature in contact is generally −70° C. to 200° C., and preferably 10° C. to 150° C. Solid titanium catalyst component (I) thus obtained contains titanium, magnesium, halogen, and the ether having two or more ether linkages represented by general formula (1).

In solid titanium catalyst component (I), the content of the compound having two or more ether linkages represented by general formula (1) is preferably 1 to 40 mass %, and more preferably 3 to 20 mass %, while the titanium content is preferably 0.4 to 15 mass %, and more preferably 1 to 7 mass %.

The atomic ratio of halogen/titanium is preferably 2 to 100, and more preferably 4 to 90. The molar ratio of the compound having two or more ether linkages/titanium is preferably 0.01 to 100, and more preferably 0.2 to 10. The atomic ratio of magnesium/titanium is preferably 2 to 100, and more preferably 4 to 50.

<Olefin Polymerization Catalyst>

The olefin polymerization catalyst of the present invention contains solid titanium catalyst component (I) and organometallic catalyst component (II) containing a metal element selected from the metals in Groups I to III.

<Organometallic Catalyst Component (II)>

As organometallic catalyst component (II) contained in the olefin polymerization catalyst of the present invention, there may be used, for example, organoaluminum compound, complex alkylated derivatives of a Group-I metal and aluminum, organometallic compounds of a Group-II metal, and the like.

Examples of organometallic catalyst component (II) include, for example, organoaluminum compounds represented by general formula (4) below.

$$Ra_nAlX_{3-n} \quad (4)$$

(In the formula, Ra is a $C_{1-12}$ hydrocarbon group; X is a halogen or hydrogen atom; and 1≤n≤3.).

In general formula (4), Ra is a $C_{1-12}$ hydrocarbon group, for example, an alkyl, cycloalkyl, or aryl group. Specifically, it includes methyl, ethyl, n-propyl, isopropyl, isobutyl, pentyl, hexyl, octyl, cyclopentyl, cyclohexyl, phenyl, tolyl, and the like. Among these, preferred are trialkylaluminums (n=3), particularly, triethylaluminum, triisobutylaluminum, and the like. These compound may be used in combination of two or more.

(Electron Donor (IV))

The olefin polymerization catalyst of the present invention may contain an electron donor as needed, besides solid titanium catalyst component (I) and organometallic catalyst component (II). As the electron donor, electron donor (III) above and other known electron donors used in olefin polymerization catalysts may be used without limitation. Among them, preferred examples are electron donor (IV), electron donor (V), and electron donor (VI) below.

Electron donor (IV) used here includes organosilicon compounds represented by general formula (2) below.

$$R^{11}{}_nSi(OR^{12})_{4-n} \quad (2)$$

(In the formula, 0<n<4; each of $R^{11}$ and $R^{12}$ represents a hydrocarbon group; n $R^{11}$s may be identical or different; and (4-n) $OR^{12}$s may be identical or different.)

The organosilicon compound represented by the above general formula includes, specifically, trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis(ethylphenyl)dimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, γ-aminopropyltriethoxysilane, chlorotriethoxysilane, ethyltri(isopropoxy)silane, vinyltributoxysilane, cyclohexyltrimethoxysilane, cyclohexyltriethoxysilane, 2-norbornyltrimethoxysilane, 2-norbornyltriethoxysilane, 2-norbornylmethyldimethoxysilane, ethyl silicate, butyl silicate, trimethylphenoxysilane, methyltriallyloxysilane, vinyltris(β-methoxyethoxy)silane, vinyltriacetoxysilane, dimethyltetraethoxydisiloxane, cyclopentyltrimethoxysilane, 2-methylcyclopentyltrimethoxysilane, 2,3-dimethylcyclopentyltrimethoxysilane, cyclopentyltriethoxysilane, dicyclopentyldimethoxysilane, bis(2-methylcyclopentyl)dimethoxysilane, bis(2,3-dimethylcyclopentyl)dimethoxysilane, dicyclopentyldiethoxysilane, tricyclopentylmethoxysilane, tricyclopentylethoxysilane, dicyclopentylmethylmethoxysilane, hexenyltrimethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, and the like. Other organosilicon compounds used for olefin polymerization catalysts described in literatures may be also used without limitation.

Of these, preferably used are trimethylmetohxysilane, ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornyltriethoxysilane, 2-norbornylmethyldimethoxysilane, phenyltriethoxysilane, dicyclopentyldimethoxysilane, hexenyltrimethoxysilane, cyclopentyltriethoxysilane, tricyclopentylmethoxysilane, and cyclopentyldimethylmethoxysilane. Particularly preferred are trimethylmethoxysilane, cyclohexylmethyldimethoxysilane, and dicyclopentyldimethoxysilane. These organosilicon compounds may be used in combination of two or more.

Electron donor (V) includes compounds having two or more ether linkages interposed with plural atoms represented by general formula (3) below. It is needless to say that the compounds represented by general formula (1) are included in the compounds represented by general formula (3).

[Formula 3]

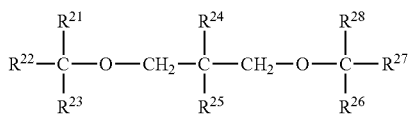

(In the formula, each of $R^{21}$ to $R^{23}$ and $R^{26}$ to $R^{28}$ is an atom or group containing at least one kind of element selected from carbon, hydrogen, halogens, nitrogen, sulfur, phosphorus, boron and silicon; any groups in $R^{21}$ to $R^{23}$ or any groups in $R^{26}$ to $R^{28}$ may bond together forming a ring other than benzene ring; and each of $R^{24}$ and $R^{25}$ is an atom or group containing at least one kind of element selected from carbon, hydrogen, oxygen, halogens, nitrogen, sulfur, phosphorus, boron, and silicon.) Such compounds can be preferably used.

As the compound having two or more ether linkages represented by general formula (3), preferred are compounds in which $R^{22}$ and/or $R^{27}$ is/are (an) atom(s) or group(s) selected from hydrogen atom, methyl group, ethyl group, propyl group, and butyl group. More preferred are compounds in which $R^{22}$ and/or $R^{27}$ is/are (an) atom(s) or group(s) selected from hydrogen atom and methyl group.

The total number of carbon atoms in $R^{24}$ and $R^{25}$ is preferably 3 to 7. Each of $R^{24}$ and $R^{25}$ is preferably a $C_{1-4}$ hydrocarbon group.

The $C_{1-4}$ hydrocarbon group is preferably methyl, ethyl, n-propyl, isopropyl, n-butyl, isobutyl, or tert-butyl, and particularly preferably methyl, ethyl, n-propyl, or n-butyl.

The compound having two or more ether linkages represented by general formula (3) includes, specifically, 2-isopentyl-2-isopropyl-1,3-dimethoxypropane, 2-ethyl-2-n-propyl-1,3-dimethoxypropane, 2-ethyl-2-methyl-1,3-dimethoxypropane, 2,2-diethyl-1,3-dimethoxypropane, 2-isobutyl-2-isopropyl-1,3-dimethoxypropane, 2-methyl-2-n-propyldiethoxypropane, 2-methyl-2-isopropyldiethoxypropane, 2-methyl-n-butyldiethoxyproapne, 2,2-diethyl-1,3-diethoxypropane, 2-ethyl-2-n-propyldiethoxypropane, 2-ethyl-2-isopropyldiethoxypropane, 2,2-di-n-propyldiethoxypropane, and the like. Particularly preferred are 2-isobutyl-2-isopropyl-1,3-dimethoxypropane, 2-methyl-2-n-propyl-1,3-diethoxypropane, and 2,2-diethyl-1,3-diethoxypropane.

Besides the above compounds, there may be used compounds having plural ether linkages used for olefin polymerization catalysts described in literatures such as Japanese Patent Laid-Open Publication No. H3-706 above, and the like.

The compounds having two or more ether linkages represented by general formula (3) may be also used in combination of two or more.

<Electron Donor (VI)>

Electron donor (VI) includes nitrogen-containing compounds, oxygen-containing compound other than above, phosphorous-containing compounds, and the like.

As the nitrogen-containing compound, specifically, compounds as shown below may be used: 2,6-substituted piperidines such as

[Formula 4]

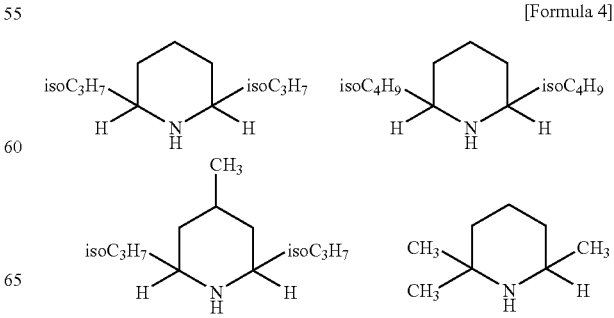

-continued

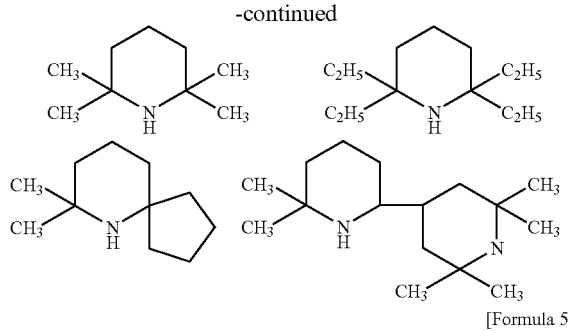

[Formula 5]

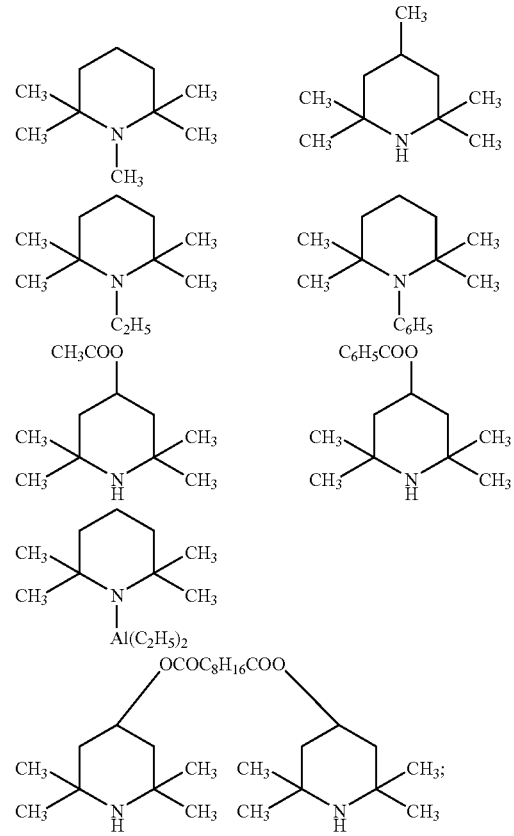

2,5-substituted pyrrolidines such as

[Formula 6]

substituted methylenediamines such as N,N,N',N'-tetramethylmethylenediamine and N,N,N',N'-tetraethylmethylenediamine; substituted methylenediamines such as 1,3-dibenzylimidazolidine and 1,3-dibenzyl-2-phenylimidazolidine; and the like.

As the phosphorus-containing compound, there may be used specifically phosphites such as triethyl phosphite, tri-n-propyl phosphite, tri-isopropyl phosphite, tri-n-butyl phosphite, tri-isobutyl phosphite, diethyl n-butyl phosphite, and diethyl phenyl phosphite, and the like.

As the oxygen-containing compound, compounds as shown below may be used: 2,6-substituted tetrahydropyrans and 2,5-substituted tetrahydropyrans such as

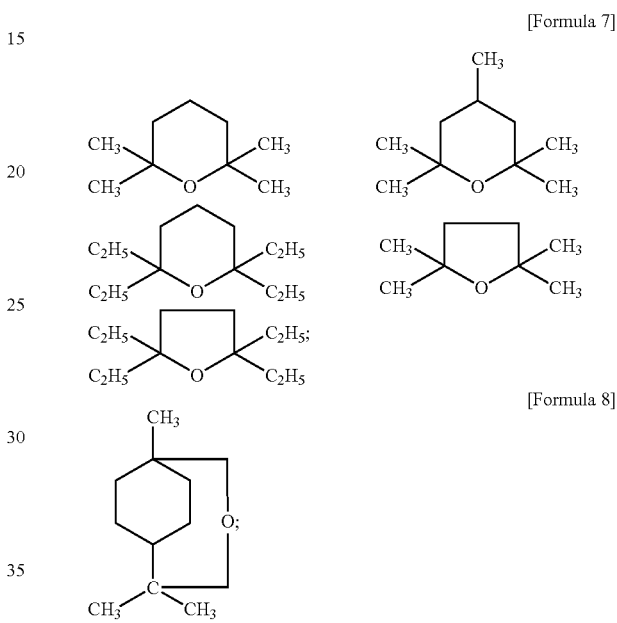

and the like. Electron donor (IV), electron donor (V), and electron donor (VI) described above may be used in combination of two or more. Among these, electron donor (IV) and electron donor (V) are preferred. The compounds represented by general formula (3) are more preferred. The compounds represented by general formula (I) are particularly preferred.

The polymerization catalyst of the present invention may contain other components effective to olefin polymerization, besides the above components.

[Prepolymerization]

The olefin polymerization catalyst according to the present invention may be a prepolymerized catalyst obtained by prepolymerizing a $C_5$ or higher branched α-olefin. In the prepolymerized catalyst, the amount of $C_5$ or higher branched α-olefin prepolymerized is preferably 0.1 to 200 g, more preferably 0.3 to 100 g, and particularly preferably 1 to 50 g, per gram of solid titanium catalyst component (I).

In the prepolymerization, the catalyst may be used in a concentration higher than that in the main polymerization described later. In the process for producing an α-olefin polymer according to the present invention, the concentration of solid titanium catalyst component (I) desirable for the prepolymerization is generally 0.01 to 200 millimoles, preferably 0.1 to 50 millimoles, and particularly preferably 1 to 20 millimoles in terms of titanium atom per liter of the liquid medium.

The amount of organometallic catalyst component (II) may be selected such that the amount of the polymer formed is preferably 0.1 to 200 g, and more preferably 0.3 to 100 g per gram of solid titanium catalyst component (I). The desirable amount is generally 0.1 to 300 moles, preferably 0.5 to 100 moles, and particularly preferably 1 to 50 moles per mole of titanium atoms in solid titanium catalyst component (I).

In the process for producing an olefin polymer according to the present invention, an electron donor may be used if needed in the prepolymerization. As the electron donor, there may be used electron donor (III) above and other known electron donors used for olefin polymerization catalysts without limitation. Among these, preferred are electron donor (IV), electron donor (V), and electron donor (VI). In the process for producing an α-olefin polymer according to the present invention, the amount of the electron donor used here is preferably 0.1 to 50 moles, more preferably 0.5 to 30 moles, and further preferably 1 to 10 moles per mole of titanium atoms in solid titanium catalyst component (I).

The prepolymerization may be performed under such mild conditions that, for example, an olefin and the above catalyst components are added to an inert hydrocarbon medium. The inert hydrocarbon medium used here includes, specifically, aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride and chlorobenzene; mixtures thereof; and the like. Among these inert hydrocarbon media, particularly, aliphatic hydrocarbons are preferably used. When such an inert hydrocarbon medium is used, it is desirable to perform the prepolymerization in batch. The prepolymerization may be performed in a medium of the olefin itself.

As the olefin used for the prepolymerization, preferred are $C_5$ or higher branched α-olefins, which include 3-methyl-1-butene, 3-methyl-1-pentene, 4-methyl-1-pentene, and 4,4-dimethyl-1-pentene. Among these, 3-methyl-1-butene, 3-methyl-1-pentene, and 4-methyl-1-pentene are used particularly preferably.

The olefin used for the prepolymerization may be different from or identical with the olefin used for the main polymerization described later. In the prepolymerization, the desirable reaction temperature is generally from −20 to +100° C., preferably from −20 to +80° C., and more preferably from 0 to +40° C. In the prepolymerization, a molecular weight modifier such as hydrogen may be used.

[Process for Producing Olefin Polymer]

The process for producing an olefin polymer according to the present invention comprises polymerization or copolymerization (main polymerization) of at least one kind of monomer including a $C_3$ or higher α-olefin in the presence of the above olefin polymerization catalyst, optionally preceded by prepolymerization.

The $C_3$ or higher α-olefin includes propylene, 1-butene, 1-pentene, 1-hexene, 1-octene, 1-decene, 1-dodecene, 1-tetradecene, 1-hexadecene, 1-octadecene, 4-methyl-1-pentene, 3-methyl-1-pentene, and the like. There is used preferably a $C_4$ or higher α-olefin, more preferably $C_6$ or higher α-olefin, further preferably a $C_{6\text{-}10}$ α-olefin, and particularly preferably, 4-methyl-1-pentene.

In the process for producing an olefin polymer of the present invention, polymerization of the above α-olefin, particularly 4-methyl-1-pentene, can be performed with higher catalytic activity, and an olefin polymer with superior tacticity and crystallinity can be obtained compared to processes with a conventional catalyst.

In the present invention, two or more $C_3$ or higher α-olefins may be copolymerized, or at least one $C_3$ or higher α-olefin may be copolymerized with ethylene.

In particular, when 4-methyl-1-pentene is used as one of the α-olefins, it is preferably copolymerized with a linear olefin in terms of high mechanical strength of the resultant polymer. The linear olefin includes, specifically, 1-decene, 1-dodecene, 1-tetradecene, 1-hexadecene, and 1-octadecene.

In the process for producing an olefin polymer (polymerization process) according to the present invention, (a) $C_3$ or higher α-olefin(s) may be also copolymerized with another monomer, which includes aromatic vinyl compounds such as styrene and allylbenzene; alicyclic vinyl compounds such as vinyl cyclohexane, cyclo-olefins such as cyclopentene, cycloheptene, norbornene, 5-methyl-2-norbornene, tetracyclododecene, and 2-methyl-1,4:5,8-dimethano-1,2,3,4,4a,5,8,8a-octahydronaphthalene; and compounds having a pularity of unsaturated bonds including conjugated or non-conjugated dienes such as 6-methyl-1,6-octadiene, 7-methyl-1,6-ocatadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, isoprene, and butadiene.

In the present invention, the polymerization may be performed by any of liquid-phase polymerization such as solution polymerization, suspension polymerization, and bulk polymerization, gas-phase polymerization, and other known polymerization methods. In liquid-phase polymerization, the inert hydrocarbon described in the section of prepolymerization may be used as a solvent, or there may be used an olefin that is liquid under the polymerization condition, which serves as a solvent.

In the process for producing an α-olefin polymer (polymerization process) according to the present invention, the preferred amount of solid titanium catalyst component (I) used therein is, for example, in liquid polymerization, generally 0.0001 to 0.5 millimoles, and preferably 0.0005 to 0.1 millimoles in terms of titanium atom per liter of the whole volume of liquid phase. The preferred amount of organometallic compound catalyst component (II) used therein is generally 1 to 2000 moles, and preferably 5 to 500 moles in terms of the metal atom in the organometallic compound catalyst component per mole of titanium atoms in solid titanium catalyst component (I) in the polymerization system.

The preferred amount of electron donor (IV), electron donor (V), or electron donor (VI) used therein is generally 0.1 to 1000 moles, and preferably 1 to 500 moles per mole of titanium atoms in solid titanium catalyst component (I).

When an electron donor selected from electron donor (IV), electron donor (V), and electron donor (VI) is used in the amount specified above in the main polymerization, the process is preferable since a polymer having high tacticity and crystallinity can be produced without significant decrease in the polymerization activity.

By using hydrogen in the main polymerization, the molecular weight of the resulting polymer can be regulated, yielding a polymer having a high melt flow rate.

In the present invention, the temperature and pressure for olefin polymerization depend on the polymerization method and the monomer(s) to be polymerized, but the temperature is generally 10 to 200° C. and preferably 30 to 150° C., and the pressure is generally normal pressure to 5 MPa and preferably 0.05 to 4 MPa.

In the polymerization process of the present invention, the polymerization may be performed in any of batch, semi-continuous, and continuous modes. The polymerization may be performed in two or more steps with different reaction conditions.

By polymerizing or copolymerizing mainly (a) $C_3$ or higher α-olefin(s) with the above polymerization catalyst, there can be obtained a polymer whose melt flow rate (MFR) is 0.001 to 200 g/10 min, and preferably 0.01 to 100 g/10 min.

The polymer obtained by the process for producing an olefin polymer of the present invention has high tacticity, and although the properties depend on the olefin(s) used, the polymer has well-balanced heat resistance, transparency, formability, and mechanical strength. In particular, 4-methyl-1-pentene can be polymerized to yield a resin with well-balanced heat resistance and transparency, and copolymerization with the above olefin(s) also works well.

The olefin polymer thus obtained may be blended with a heat stabilizer, weathering stabilizer, antistatic agent, antiblocking agent, lubricant, nucleating agent, pigment, dye, inorganic or organic filler, or the like as needed.

[4-Methyl-1-pentene-based polymer (1)]

The present invention using the above olefin polymerization catalyst can easily provide, for example, a 4-methyl-1-pentene-based polymer containing 80 to 99.9 mass % of structural units derived from 4-methyl-1-pentene ($A_1$) and 0.1 to 20 mass % of structural units derived from at least one $C_{3-11}$ α-olefin except 4-methyl-1-pentene ($B_1$), wherein the ratio of the content of structural units derived from the at least one $C_{3-11}$ α-olefin(s) except 4-methyl-1-pentene in the n-decane-soluble component, $a_1$ in mass %, to the content of structural units derived from 4-methyl-1-pentene in said olefin polymer, $b_1$ in mass %, ($a_1/b_1$) is 2.0 to 4.0.

In the present invention, as the at least one $C_{3-11}$ α-olefin except 4-methyl-1-pentene ($B_1$), preferred are $C_{6-10}$ α-olefins, and more preferred are $C_{8-10}$ α-olefins. Specifically, preferred are 1-hexene, 1-pentene, 1-octene, 1-nonene, and 1-decene, and more preferred are 1-octene, 1-nonene, and 1-decene.

When the above α-olefin(s) is/are used as the at least one $C_{3-11}$ α-olefin except 4-methyl-1-pentene, the copolymerization nicely proceeds and provides a copolymer having excellent toughness.

In the 4-methyl-1-pentene-based polymer, the content of structural units derived from 4-methyl-1-pentene ($A_1$) is preferably in the range of 80.0 to 99.9 mass %, and more preferably 96.0 to 98.0 mass %. In the 4-methyl-1-pentene-based polymer, the content of structural units derived from the at least one $C_{3-11}$ α-olefin ($B_1$) except 4-methyl-1-pentene is preferably in the range of 0.1 to 20.0 mass %, and more preferably 2.0 to 4.0 mass %.

In the 4-methyl-1-pentene-based polymer, when the content of structural units derived from 4-methyl-1-pentene and the content of structural units derived from the at least one $C_{3-11}$ α-olefin except 4-methyl-1-pentene are in the above ranges, a film formed from said copolymer is excellent in releasability and toughness.

The content of structural units derived from the $C_{3-11}$ α-olefin(s) except 4-methyl-1-pentene in the n-decane-soluble component of the 4-methyl-1-pentene-based polymer, $a_1$ (mass %), can be determined by nuclear magnetic resonance (NMR) measurement. For example, for a copolymer of 4-methyl-1-pentene and (a) $C_3$ or higher α-olefin(s), the NMR spectrum is recorded under the following conditions. NMR spectrometer: GSX-400, manufactured by JEOL Ltd.

Solvent: benzene-dao-dichlorobenzene mixed solvent
Sample concentration: 50 to 100 g/liter-solvent
Measurement condition: Pulse interval 5.5 sec; Scan number 16000; measurement temperature 120° C.

The peak area is obtained for each of the following signals in the $^{13}$C-NMR spectrum recorded under the above conditions to calculate the molar content of structural units derived from the α-olefin except 4-methyl-1-pentene in the copolymer using the following equation. The mass content, $a_1$ (mass %), can be obtained by converting the molar content using the molecular weights of the α-olefins composing the copolymer.

α-Olefin content (mol %)=$[P2/(P1+P2)]100$

P1: around 46 ppm, assigned to the side-chain $CH_2$ in 4-methyl-1-pentene, represented by (P1) in the following formula.

P2: assigned to the comonomer's side-chain $CH_2$ or $CH_3$ directly bonded to the main-chain methylene, represented by (P2) in the following formula.

The chemical shift of P2 depends on the structure of α-olefin comonomer: 21 ppm for propylene, 27 ppm for 1-butene, and around 35 ppm for 1-hexene and higher linear α-olefins. The α-olefin copolymer can be identified based on the ratio of absorption intensity at around 35 ppm and that at around 30 ppm.

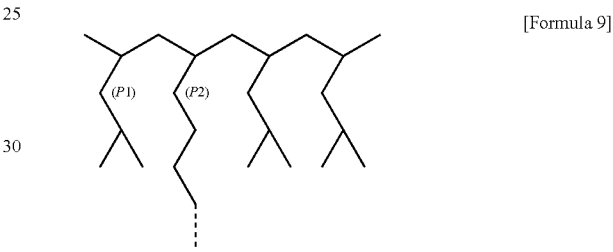

[Formula 9]

The content of structural units derived from the $C_{3-11}$ α-olefin(s) except 4-methyl-1-pentene in the 4-methyl-1-pentene-based polymer, $b_1$ (mass %), can be determined similarly to the above method for determining $a_1$, the content of structural units derived from the $C_{3-11}$ α-olefin(s).

The present invention is characterized in that the ratio of $a_1$ (mass %) to $b_1$ (mass %) ($a_1/b_1$) is in the range of 2.0 to 4.0.

In copolymers of 4-methyl-1-pentene and at least one $C_{3-11}$ α-olefin except 4-methyl-1-pentene, generally a close relationship is observed between the content of structural units derived from the at least one $C_{3-11}$ α-olefin except 4-methyl-1-pentene in the n-decane-soluble component and the releasability of a formed article obtained from the copolymer, for example, the blocking factor of a film. With increase of this content in the n-decane-soluble component, the releasability of the formed article tends to deteriorate, for example, the blocking factor of the film obtained tends to increase.

In the above copolymers, on the other hand, the content of structural units derived from the at least one $C_{3-11}$ α-olefin except 4-methyl-1-pentene in the copolymer generally has a strong relationship with the toughness and handleability of a film obtained therefrom. With decrease of this content in the copolymer, the mechanical property of the film, for example, the toughness is lowered. Such a film tends to cause difficulty in handling such as occurrence of break or crack on reeling or cutting the film.

Accordingly, the ratio $a_1/b_1$ is an important index for producing a polymer capable of forming a film having a low blocking factor, excellent mechanical properties, and excellent handleability. With the above range of the ratio $a_1/b_1$, a polymer can provides a formed article excellent in not only releasability but also mechanical properties such as toughness. Such a polymer provides, for example, a film having a low blocking factor and high toughness.

Further, such polymer can provide a film having good releasability even with increasing absolute content of the structural unit derived from the at least one $C_{3-11}$ α-olefin except 4-methyl-1-pentene in the n-decane-soluble component. For example, when this film is used as a release film, the releasability is good and the amount of materials transferred from the release film to the substrate is reduced as compared with conventional films.

The ratio $a_1/b_1$ is preferably in the range of 2.0 to 4.0, and more preferably 2.5 to 4.0. With this range of $a_1/b_1$, a film having good releasability and excellent toughness can be obtained.

In terms of surface stickiness, releasability, and strength of formed articles, it has been considered so far that formed articles such as films obtained from a 4-methyl-1-pentene-based polymer exhibit better performances when the polymer has a lower molar content of structural units derived from (a) $C_{3-11}$ α-olefin(s) except 4-methyl-1-pentene in its n-decane-soluble component. Namely, it has been considered that the polymer with lower $a_1/b_1$ exhibits preferred performances in the above aspects. However, 4-methyl-1-pentene-based polymer (1) of the present invention surprisingly exhibits desirable performances in a relatively high range of $a_1/b_1$. Although the reason for this tendency is not clarified, this is likely because the polymer of the present invention has high tacticity and quite uniform distribution of structural units derived from the $C_{3-11}$ α-olefin(s). Namely, it is likely that 4-methyl-1-pentene-based polymer (1) of the present invention is characterized in that its n-decane-soluble component contains only polymers having structural units derived from the $C_{3-11}$ α-olefin(s) in a higher content than conventional polymers, and hence exhibits the above preferred range of $a_1/b_1$.

The ratio $a_1/b_1$ can be controlled as follows:

4-Methyl-1-pentene ($A_1$) and the at least one $C_{3-11}$ α-olefin except 4-methyl-1-pentene ($B_1$) are copolymerized in such a manner that the 4-methyl-1-pentene-based polymer contains 0.1 to 20 mass %, preferably 2 to 4 mass %, of structural units derived from at least one $C_{3-11}$ α-olefin except 4-methyl-1-pentene ($B_1$) using the olefin polymerization catalyst of the present invention, which contains the specific solid titanium catalyst component (I) and organometallic catalyst component (II), thereby $a_1/b_1$ can be controlled.

The ratio $a_1/b_1$ can be also controlled using electron donors (IV) to (VI) together with solid titanium catalyst component (I) and organometallic catalyst component (II).

[4-Methyl-1-pentene-based polymer (2)]

In the present invention, using the above olefin polymerization catalyst, there can be easily produced 4-methyl-1-pentene-based polymer (2) containing 80 to 99.9 mass % of structural units derived from 4-methyl-1-pentene ($A_2$) and 0.1 to 20 mass of structural units derived from at least one $C_{12-20}$ α-olefin ($B_2$), wherein the ratio of the content of structural units derived from the $C_{12-20}$ α-olefin(s) in its n-decane-soluble component, $a_2$ in mass %, to the content of structural units derived from the at least one $C_{12-20}$ olefin(s) in the olefin polymer, $b_2$ in mass %, ($a_2/b_2$) is 3.0 to 6.0.

In the present invention, the at least one $C_{12-20}$ α-olefin ($B_2$) is preferably a $C_{12-18}$ α-olefin. Specifically, preferred are 1-dodecene, 1-tridecene, 1-tetradecene, 1-pentadecene, 1-hexadecene, 1-octadecene, 1-nonadecene, and 1-eicosene, and more preferred are 1-dodecene, 1-tetradecene, 1-hexadecene, and 1-octadecene.

When the above α-olefin(s) is/are used as the at least one $C_{12-20}$ α-olefin, copolymerization nicely proceeds and yields a copolymer excellent in toughness.

In the 4-methyl-1-pentene-based polymer, the content of structural units derived from 4-methyl-1-pentene ($A_2$) is preferably 80.0 to 99.9 mass %, and more preferably 92.0 to 98.0 mass %, while the content of structural units derived from the at least one $C_{12-20}$ α-olefin ($B_2$) is preferably 0.1 to 20.0 mass %, and more preferably 2.0 to 8.0 mass %.

In the 4-methyl-1-pentene-based polymer, when the content of structural units derived from 4-methyl-1-pentene and the content of structural units derived from the at least one $C_{12-20}$ α-olefin are in the above ranges, a film having excellent releasability and toughness can be attained.

The content of structural units derived from the one $C_{12-20}$ α-olefin in the n-decane-soluble component of the 4-methyl-1-pentene-basedpolymer, $a_2$ (mass %), can be determined similarly to the content of structural units derived from (a) $C_{3-11}$ α-olefin(s), $a_1$.

The content of structural units derived from the $C_{12-20}$ α-olefin(s) in the 4-methyl-1-pentene-based polymer, $b_2$ (mass %), can be determined similarly to the content of structural units derived from (a) $C_{3-11}$ α-olefin(s), $b_1$.

The present invention is characterized in that the ratio of $a_2$ in mass % to $b_2$ in mass % ($a_2/b_2$) is in the range of 3.0 to 6.0.

In a copolymer of 4-methyl-1-pentene and the at least one $C_{12-20}$ α-olefin, generally, the content of structural units derived from the at least one $C_{12-20}$ α-olefin in the n-decane-soluble component has a close relationship to the releasability of formed articles, for example, the blocking factor of films obtained from the copolymer. As this content in the n-decane-soluble component increases, the copolymer tends to give formed articles with inferior releasability, for example, films with higher blocking factor.

In the above copolymer, on the other hand, the content of structural units derived from the at least one $C_{12-20}$ α-olefin in the copolymer generally has a close relationship to the toughness and handleability of the film. As this content in the copolymer decreases, the film degrades in mechanical properties, for example, toughness. Such a film tends to cause difficulty in handling such as occurrence of break or crack on reeling or cutting the film.

Accordingly, the ratio $a_2/b_2$ is an important index for producing a polymer capable of proving films having a low blocking factor and excellent mechanical properties and handleability. A polymer with the above range of $a_2/b_2$ can provide formed articles excellent in not only releasability but also mechanical properties such as toughness. Such a polymer provides, for example, films having a low blocking factor and high toughness.

Such a polymer can provide a film with good releasability even with a higher absolute content of structural units derived from the at least one $C_{12-20}$ α-olefin in its n-decane-soluble component. For example, when this film is used as a release film, the releasability is good and the amount of materials transferred from the release film to the substrate is reduced as compared with conventional films.

The ratio $a_2/b_2$ is preferably in the range of 3.0 to 6.0, and more preferably 4.0 to 6.0. With this range of $a_2/b_2$, films with good releasability and excellent toughness can be obtained.

In terms of surface stickiness, releasability, and strength of formed articles, it has been so far considered that formed articles such as films obtained from a 4-methyl-1-pentene-based polymer exhibit better performances when the molar content of structural units derived from (a) $C_{12-20}$ α-olefin(s) except 4-methyl-1-pentene in the n-decane-soluble component of the polymer. Namely, it has been considered that the polymer with lower $a_2/b_2$ exhibits preferred performances in the above aspects. However, 4-methyl-1-pentene-based polymer (2) of the present invention surprisingly exhibits preferable performances in a relatively high range of $a_2/b_2$. Although the reason for this tendency is not clarified, this is likely because the polymer of the present invention has high tacticity and quite uniform distribution of structural units derived from the $C_{12-20}$ α-olefin(s). Namely, it is likely that 4-methyl-1-pentene-based polymer (2) of the present invention has a feature that its n-decane-soluble component contains only polymers containing structural units derived from the $C_{12-20}$ α-olefin(s) in a higher content than conventional polymers, and hence exhibits the above preferred range of $a_2/b_2$.

The ratio $a_2/b_2$ can be controlled as follows:

4-Methyl-1-pentene ($A_2$) and the at least one $C_{12-20}$ α-olefin except 4-methyl-1-pentene ($B_2$) are copolymerized in such a manner that the content of structural units derived from at least one $C_{12-20}$ α-olefin except 4-methyl-1-pentene ($B_2$) is 0.1 to 20 mass %, preferably 2 to 8 mass %, in the 4-methyl-1-pentene-based polymer, using the olefin polymerization catalyst of the present invention, which contains the specific solid titanium catalyst component (I) and organometallic catalyst component (II), thereby $a_2/b_2$ can be controlled.

The ratio $a_2/b_2$ can be also controlled using electron donors (IV) to (VI) together with solid titanium catalyst component (I) and organometallic catalyst component (II).

[Film]

4-Methyl-1-pentene-based polymer (1) and 4-methyl-1-pentene-based polymer (2) obtained by the present invention can be formed into films excellent in releasability and also transparency, heat resistance, anti-fogging property, appearance, and mechanical properties such as toughness.

The film of the present invention may be a single-layer film containing 4-methyl-1-pentene-based polymer (1) and/or 4-methyl-1-pentene-based polymer (2) according to the present invention as a resin or may be a multi-layer film having at least one layer containing 4-methyl-1-pentene-based polymer (1) and/or 4-methyl-1-pentene-based polymer (2) according to the present invention as a resin and (a) layer(s) made of (an)other resin(s) or the like.

The thickness of the above single-layer film is generally in the range of 20 to 100 μm, preferably 25 to 60 μm, and more preferably 40 to 60 μm.

The whole thickness of the above multi-layer film is generally in the range of 40 to 200 μm, preferably 100 to 180 μm, and more preferably 120 to 150 μm. In the multi-layer film, the total thickness of layers containing 4-methyl-1-pentene-based polymer (1) and/or 4-methyl-1-pentene-based polymer (2) according to the present invention as a resin is preferably 25% or more, more preferably 30% or more, and still more preferably 40% or more, of the whole thickness of the film.

The process for producing the film from the polymer is not particularly limited and includes, for example, T-die molding, extrusion molding such as tubular extrusion (inflation molding), solution-casting, calendar molding, and the like.

Among these, T-die molding is preferred for attaining uniformity of film thickness.

The blocking factor of the film is generally in the range of 2.0 to 10.0 g/cm, and preferably 2.0 to 7.0 g/cm.

The film having a blocking factor within the above range exhibits extremely excellent releasability. For example, when the film is used as a release film for producing a flexible printed circuit board (FPC), it is quite easily peeled off from the printed circuit board which has been press-molded, and therefore this film can be suitably used as a release film for producing FPC.

[4-Methyl-1-pentene-based polymer film (1)]

Forming 4-methyl-1-pentene-based polymer (1) of the present invention as described above provides a film having a ratio $c_1/d_1$ of 0.1 to 1.5, wherein $c_1$ denotes the blocking factor (g/cm) of the film and $d_1$ denotes the content (mol %) of structural units derived from (a) $C_{3-11}$ α-olefin(s) except 4-methyl-1-pentene in the n-decane-soluble component of 4-methyl-1-pentene-based polymer (1) used for forming the film.

So far, it has been believed that the molar content of structural units derived from (a) $C_{3-11}$ α-olefin(s) except 4-methyl-1-pentene in the n-decane-soluble component of 4-methyl-1-pentene-based polymer (1) should be reduced in order to improve releasability of the film. However, decreasing this molar content generally tends to deteriorate toughness of the film as a whole. In contrast, the film having $c_1/d_1$ within the above range exhibits excellent mechanical properties, for example, toughness, and handleabiity in reeling, cutting, and the like of the film even if the blocking factor itself is low.

The blocking factor $c_1$ of the film can be determined in accordance with ASTM D1893-67. The content $d_1$ (mol %) of structural units derived from the $C_{3-11}$ α-olefin(s) except 4-methyl-1-pentene in the n-decane-soluble component of the 4-methyl-1-pentene-based polymer can be determined by $^{13}$C-NMR measurement in the same manner as described above.

In the above range, $c_1/d_1$ is preferably from 0.2 to 1.0, and more preferably from 0.3 to 0.8.

A film with $c_1/d_1$ in the above range exhibits good releasability and excellent toughness.

The ratio $c_1/d_1$ can be controlled as follows:

In such a manner that the content of structural units derived from at least one $C_{3-11}$ α-olefin except 4-methyl-1-pentene ($B_1$) becomes 0.1 to 20 mass %, and preferably 2 to 4 mass % in the 4-methyl-1-pentene-based copolymer, 4-methyl-1-pentene ($A_1$) and the at least one $C_{3-11}$ α-olefin except 4-methyl-1-pentene ($B_1$) are copolymerized using the olefin polymerization catalyst of the present invention containing the specific solid titanium catalyst component (I) and organometallic catalyst component (II) to obtain a copolymer, and the copolymer is formed into a film, thereby $c_1/d_1$ is controlled.

[4-Methyl-1-pentene-based polymer film (2)]

Forming the 4-methyl-1-pentene-based polymer (2) of the present invention as described above can provide a film having a ratio $c_2/d_2$ of 0.1 to 1.5, wherein "$c_2$" denotes the blocking factor (g/cm) of the film, and "$d_2$" denotes the content (mol %) of structural units derived from (a) $C_{12-20}$ α-olefin(s) in the n-decane-soluble component of the 4-methyl-1-pentene-based polymer (2) used for forming the film.

So far, it has been believed that the molar content of the structural units derived from the $C_{12-20}$ α-olefin(s) in the n-decane-soluble component of the 4-methyl-1-pentene-based polymer (2) should be reduced in order to improve the releasability of the film. However, decreasing this molar content generally tends to deteriorate the toughness of the film as a whole. While on the other hand, the film having $c_2/d_2$ within the above range exhibits excellent mechanical properties, for example, toughness, and handleability in reeling, cutting, and the like of the film.

The blocking factor $c_2$ of the film can be determined in accordance with ASTM D1893-67. The content $d_2$ (mol %) of structural units derived from the $C_{12-20}$ α-olefin(s) in the n-decane-soluble component of the 4-methyl-1-pentene-based polymer can be determined by $^{13}$C-NMR in the same manner as described above.

In the above range, $c_2/d_2$ is preferably 0.2 to 1.0, and more preferably 0.3 to 0.8.

A film having $c_2/d_2$ within the above range exhibits good releasability and excellent toughness.

The ratio of $c_2/d_2$ can be controlled as follows:

4-methyl-1-pentene ($A_2$) and the at least one $C_{12-20}$ α-olefin except 4-methyl-1-pentene ($B_2$) are copolymerized in such a manner that the content of structural units derived from at least one $C_{12-20}$ α-olefin ($B_2$) except 4-methyl-1-pentene becomes 0.1 to 20 mass %, and preferably 2 to 8 mass % in the 4-methyl-1-pentene-based poymer, using the olefin, polymerization catalyst of the present invention containing the specific solid titanium catalyst component (I) and organometallic catalyst component (II) to obtain a copolymer, and this copolymer is formed into a film, thereby $c_2/d_2$ can be controlled.

The film of the present invention thus obtained is excellent in releasability and also transparency, heat resistance, antifogging property, appearance, and mechanical properties such as toughness. The film is suitably used as a release film for producing electronic circuit boards, release film for artificial leather, wrapping film for agriculture and foods, and baking carton. The film can be also used as one layer in unwoven fabric laminates or laminated paper, which is a kind of laminate.

[Release Film]

4-Methyl-1-pentene-based polymer film (1) and 4-methyl-1-pentene-based polymer film (2) obtained as described above are excellent in releasability, fouling resistance, moisture absorption resistance, and the like. The films can be suitably used as release films, for example, release films for printed circuit boards, especially for flexible printed circuit boards.

In production processes of printed circuit boards, flexible printed circuit boards, multi-layer printed circuit boards, and the like, a release film is used in hot-pressing a copper-plated laminate board or copper foil through a prepreg or heat-resistant film. Further, in producing a flexible printed circuit board, when a coverlay film is bonded by hot-press with a thermosetting adhesive to a mother flexible printed circuit board with electronic circuit formed thereon, interposing a release film is a common method for preventing adhesion between the coverlay film and a hot-press plate. In producing plural single-layer or multi-layer printed circuit boards at one time, release films are also imposed for preventing adhesion of printed circuit boards to each other and protecting printed circuit board products.

The conventional release films so far proposed include polymethylpentene films, silicone-coated polyester films, fluororesin films, syndiotactic polystyrene films, alicyclic polyolefin films, polyamide films, polyether aromatic ketone resin films, and the like. However, these release films proposed had weakness in releasability from coverlay films or the like, particularly, poor plating due to materials from the films to copper foil in producing multi-layer flexible circuit boards. Further, with the recent growing social awareness to environmental problems and safety issues, these release films are increasingly requested to have moisture absorption resistance, rigidity, and anti-fouling property in addition to heat resistance compatible with hot-press molding and releasability from printed circuit boards (including polyimide resin, epoxy resin, epoxy resin adhesives, and copper foil) or hot-press plates.

The release film of the present invention may be a single-layer film containing 4-methyl-1-pentene-based polymer (1) and/or 4-methyl-1-pentene-based polymer (2) according to the present invention as a resin, or it may be a multi-layer film having a layer containing 4-methyl-1-pentene-based polymer (1) and/or 4-methyl-1-pentene-based polymer (2) according to the present invention as a resin and (a) layer(s) made of (an)other resin(s) or the like. In the multi-layer film, its outermost layer, which contacts with a substrate, for example, printed circuit board, is preferably a layer containing 4-methyl-1-pentene-based polymer (1) and/or 4-methyl-1-pentene-based polymer (2) according to the present invention as a resin, because the layer made of the polymer(s) of the present invention is excellent in releasability.

Particularly, for a release film used in producing flexible printed circuit boards, considering cushioning function that the film is adhered in response to steps at boundaries between polyimide film and copper foil to reduce the impact when pressed with hot-press (hereinafter, abbreviated as "adherence"), the release film is more preferably a multi-layer film, particularly a multilayer film whose outermost layer contacting to the printed circuit board is a layer containing 4-methyl-1-pentene-based polymer (1) and/or 4-methyl-1-pentene-based polymer (2) according to the present invention as a resin.

The thickness of the single-layer film is generally in the range of 3 to 100 μm, but considering the production cost and handleability, preferably 10 to 100 μm, and more preferably 30 to 60 μm.

The whole thickness of the multi-layer film is generally in the range of 50 to 300 μm, but considering the adherence and workability, preferably 70 to 250 μm, and more preferably 100 to 200 μm.

In the multi-layer film, as described above, the outermost layer contacting to a substrate is preferably a layer containing 4-methyl-1-pentene-based polymer (1) and/or 4-methyl-1-pentene-based polymer (2) according to the present invention as a resin, and the thickness of the outermost layer is preferably 25% or more, more preferably 30% or more, and further preferably 40% or more of the whole thickness of the film.

There is no particular limitation on the method for producing the release film of the present invention. The film can be produced by extrusion molding, for example, tubular extrusion, which is also called inflation molding.

When the release film is produced by tubular extrusion, in order to obtain a uniform film thickness, it is quite important to keep a parison extruded out of the cylinder at a controlled temperature properly selected from the range of 50 to 290° C. so as to prevent immediate cooling of the parison.

A multi-layer release film can be obtained by laminating a layer containing 4-methyl-1-pentene-based polymer (1) and/or 4-methyl-1-pentene-based polymer (2) according to the present invention as a resin with (a) layer(s) containing (an) other resin(s) or the like.

The release film of the present invention may be also produced by T-die molding. The film may be obtained as a nonoriented film, or it may be uni-axially or bi-axially oriented after the film is taken out of the T-die. Orientation is effective to increase strength and stiffness of the film.

As the method for laminating a film containing 4-methyl-1-pentene-based polymer (1) and/or 4-methyl-1-pentene-based polymer (2) according to the present invention as a resin and (a) layer(s) containing (an) other resin(s) or the like, there may be mentioned, dry lamination and co-extrusion lamination.

In dry lamination, a single-layer film containing 4-methyl-1-pentene-based polymer (1) and/or 4-methyl-1-pentene-based polymer (2) according to the present invention as a resin is firstly produced, a layer containing (an)other resin(s) or the like is extruded through a T-die while that single-layer film is fed near the T-die from above and below, and these layers are laminated with a roll. This method is effective particularly when the resin layers are largely different from each other in melt viscosity.

On the other hand, co-extrusion lamination can laminate a layer containing 4-methyl-1-pentene-based polymer (1) and/or 4-methyl-1-pentene-based polymer (2) according to the present invention as a resin and (a) layer(s) containing (an) other resin(s) or the like with an extruder equipped with multi-layer dice in one step. Co-extrusion lamination is cost-effective, because multi-layer lamination can be completed in one step.

Examples

Hereinafter the present invention will be more specifically described with Examples, but the present invention is not limited to these Examples.

The properties of solid titanium catalyst components and polymers obtained in Examples and Comparative Examples were determined by the following methods.

[Composition of Solid Titanium Catalyst Component]

The titanium and magnesium contents were analyzed by plasma emission spectrometry using ICPS7500 manufactured by Shimadzu Corporation.

The halogen content was determined by potentiometric titration with a silver nitrate solution using Hiranuma Automatic Titrator manufactured by Hiranuma Sangyo Corporation.

The compound having two or more ether linkages represented by general formula (1) was analyzed by conventional methods using gas chromatography (GC).

Specifically, 200 to 300 mg of a solid titanium catalyst component was weighed and put in a 50-ml volumetric flask, acetone was added to dissolve the solid titanium catalyst component, 50 μl of di-n-butyl phthalate is added as an internal standard, and acetone was further added to make the total volume 50 ml. This solution was neutralized with aqueous ammonia, filtered when solid was remained, and the filtrate was used as a sample solution.

The sample solution was analyzed by gas chromatography (GC) under the following conditions with GC-14A manufactured by Shimadzu Corporation with a DB-WAX column (30-cm long) manufactured by Agilent Technologies.

Injection unit temperature: 250° C.

Column temperature: After sample injection, the column temperature was kept at 50° C. for 2 minutes, elevated to 230° C. at a heating rate of 15° C./min, and kept at 230° C. for 20 minutes.

Carrier gas: Helium

Column flow rate: 1.1 ml/min

Sample injection volume: 1 μl

A calibration curve was obtained by conventional procedures using acetone solutions containing di-n-butyl phthalate as an internal standard and the ether compound represented by general formula (1) in different concentrations.

The content of the compound represented by general formula (1) in the solid titanium catalyst component was calculated from the calibration curve and the observed response in GC analysis of the solid titanium catalyst component.

[Melt Flow Rate (MFR)]

Melt flow rate was measured at a load of 5 kg at 260° C. in accordance with ASTM D1238.

In Example 12, MFR was measured at a load of 2.16 kg at 230° C.

[Apparent Bulk Density]

Each polymer was subjected to free-fall through a funnel into a cylinder having an inside volume of 100 ml. The apparent bulk density was determined from the mass of the polymer in the cylinder and the cylinder volume.

[Amount of Polymer in Filtrate]

A polymer slurry obtained by polymerizing monomers in an inert solvent was filtered to separate into solid polymer (white solid) and filtrate. The polymer dissolved in the filtrate was obtained by removing the solvent from the filtrate by evaporation. The amount of polymer in the filtrate was calculated from the following equation.

Amount of polymer in filtrate (mass %)=$W2/(W1+W2)$ 100

W1: mass of solid polymer (white solid) filtered off

W2: mass of polymer dissolved in the filtrate of the slurry.

[Tacticity Index (t-II) and Content of Decane-Soluble Component]

Three grams of the solid polymer was weighed and completely dissolved in n-decane at 150° C., the solution was cooled to 23° C. over 8 hours and filtered, and n-decane in the filtrate was evaporated to give decane-soluble polymer, mass of which was measured. This value was divided by the mass of the solid polymer initially weighed to obtain the content of polymer dissolved in n-decane (w3: content of decane-soluble component). The mass of n-decane-soluble component was calculated from this content.

$W3=W1w3/100$

W1: mass of solid polymer

W3: mass of n-decane-soluble component in the solid polymer w3: content of polymer dissolved in n-decane (mass %)

Tacticity index (t-II) was calculated using the following equation.

Tacticity index ($t$-II) (mass %)=$(W1-W3)/(W1+W2)$ 100

W1: mass of solid polymer

W2: mass of polymer dissolved in filtrate of the slurry

W3: mass of n-decane-soluble component in the solid polymer

Namely, t-II is an index to evaluate tacticity in terms of the mass ratio of decane-insoluble component to the total of the solid polymer and the polymer dissolved in the filtrate.

[Catalytic Activity]

The catalytic activity was determined by dividing the mass of the solid polymer yielded per unit time by the amount of titanium atoms (in millimoles) in the solid titanium catalyst component used for the polymerization.

[Blocking Factor]

The blocking factor (g/cm) of the film was determined in accordance with ASTM D1893-67 as follows: the polymer was formed with a cast-film forming machine equipped with a T-die at a cylinder temperature of 310° C. and a chill-roll temperature of 60° C. into a 50-μm thick film, from which two films, each 6 cm 12 cm in size, were cut out; these films were stacked together with their chill-roll sides facing to each other; the stack was sandwiched between two metal plates with mirror-finished surfaces, hot-pressed at 180° C. under a load of 5 MPa for 30 minutes, and then cooled to room temperature; and the stack was subjected to the peeling test, in which shearing force was applied at a load of 200 g, with a shearing angle of 180°, at a shearing speed of 200 mm/min with a versatile material tester, Model-2001 manufactured by INTESCO Co., Ltd., to measure the maximum load at separation.

[Molecular Weight Distribution (Mw/Mn)]

With a gel permeation chromatograph (GPC) (alliance 2000 manufactured by Waters Corporation), a GMH-type column manufactured by Tosoh Corporation, and o-dichlorobenzene as an eluent, the weight-average molecular weight (Mw) and number-average molecular weight (Mn) relative to polystyrene were measured to obtain the value of Mw/Mn.

[Content of Structural Units Derived from $C_{3-11}$ α-olefin Except 4-methyl-1-pentene or $C_{12-20}$ α-olefin in n-decane-soluble Component]

The content of structural units derived from (a) $C_{3-11}$ α-olefin (s) except 4-methyl-1-pentene or (a) $C_{12-20}$ α-olefin(s) in the n-decane-soluble component was determined by nuclear magnetic resonance (NMR).
NMR spectrometer: GSX-400, manufactured by JEOL Ltd.
Solvent: benzene-$d_6$/o-dichlorobenzene mixed solvent
Sample concentration: 50 to 100 g/liter-solvent
Measurement conditions: Pulse interval 5.5 sec; Scan number 16000; Measurement temperature 120° C.

The peak area was obtained for each of the following signals in the $^{13}$C-NMR spectrum recorded under the above conditions to calculate the molar content (mol %) of structural units derived from the α-olefin(s) except 4-methyl-1-pentene in the copolymer using the following equation. The mass content (mass %) was calculated from the molar content and the molecular weights of α-olefins corresponding to the structural units.

Comonomer content (mol %)=$[P2/(P1+P2)]100$

P1: around 46 ppm, side-chain $CH_2$ in 4-methyl-1-pentene (represented by (P1) in the following formula)
P2: comonomer's side-chain $CH_2$ directly bonded to the main-chain methylene (represented by (P2) in the following formula)

The chemical shift of P2 depends on the structure of α-olefin comonomer: 21 ppm for propylene, 27 ppm for 1-butene, and around 35 ppm for 1-hexene and higher linear α-olefins. The α-olefin copolymer can be identified based on the ratio of absorption intensity around 35 ppm and that around 30 ppm.

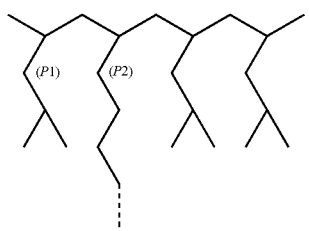

[Formula 10]

[Content of Structural Units Derived from $C_{3-11}$ α-olefin Except 4-methyl-1-pentene or $C_{12-20}$ α-olefin in Polymer]

The content was determined by $^{13}$C-NMR similarly to the content of structural units derived from the $C_{3-11}$ α-olefin(s) except 4-methyl-1-pentene or the $C_{12-20}$ α-olefin(s) in the n-decane-soluble component.

[Melting Point (Tm)]

With a differential scanning calorimeter (DSC), Model PYRIS-I manufactured by PerkinElmer, Inc., under a nitrogen atmosphere, 5 mg of a sample was heated at 280° C. for 5 minutes to melt, cooled to room temperature at a cooling rate of 20° C./min to crystallize, kept at room temperature for 10 minutes, and heated at a heating rate of 10° C./min to obtain an endothermic curve, in which the peak temperature was regarded as the melting point.

[Tensile Elongation at Break] (Toughness)

The polymer was formed into a 2 mm-thick dumbbell specimen of ASTM type-IV with an injection-molding machine, M70B manufactured by MEIKI Co., Ltd., at a cylinder temperature of 290° C. and a mold temperature of 60° C.

The dumbbell specimen obtained was subjected to the tensile test to measure the tensile elongation at break, in accordance with ASTM D638, at a tensile speed of 50 ram/min with a versatile material tester Model-2005 manufactured by INTESCO Co., Ltd.

Example 1

Preparation of Solid Titanium Catalyst Component [A-1]

Seventy-five grams of anhydrous magnesium chloride, 280.3 g of decane, and 308.3 g of 2-ethylhexyl alcohol were heated at 130° C. for 3 hours to proceed the reaction, thereby a homogeneous solution was obtained. To this solution was added 18.5 g of 2-methyl-2-n-propyl-1,3-diethoxypropane (MPEP), and the solution was further stirred at 100° C. for 1 hour.

The homogeneous solution thus obtained was cooled to room temperature, and 30 ml of this homogeneous solution was injected dropwise over 45 minutes into 80 ml of titanium tetrachloride that was kept at −20° C. and stirred. The temperature of the liquid mixture was elevated to 110° C. over 5.8 hours, here was added 0.42 g of 2-methyl-2-n-propyl-1,3-diethoxypropane, and the solution was stirred at the same temperature for 2 hours. After completion of the reaction for 2 hours, the mixture was filtered in hot to collect the solid. This solid was again suspended in 100 ml of titanium tetrachloride, and the suspension was heated again at 110° C. for 2 hours to react. After the reaction, the mixture was filtered in hot to collect the solid, and the solid was washed thoroughly with 90° C. decane and hexane until no free titanium compound was detected in the washing. The solid titanium catalyst component [A-1] prepared by the above procedures was stored as a decane slurry. Part of the slurry was dried to analyze the catalyst composition. Solid titanium catalyst component [A-1] thus obtained contained 3.6 mass % of Ti, 18 mass % of Mg, 56 mass % of Cl, 10.6 mass % of 2-methyl-2-n-propyl-1,3-diethoxypropane, and 2.3 mass % of 2-ethylhexyl alcohol residue.

[Polymerization]

In dry nitrogen stream at room temperature, a 1-liter polymerization reactor was charged with 400 ml of 4-methyl-1-pentene (dried over activated alumina under dry nitrogen), 300 ml of hydrogen, 0.5 mmol of triethylaluminum, and 0.0016 mmol (in terms of Ti) of solid titanium catalyst component [A-1]. The inside of the reactor was kept at 60° C., and the polymerization was performed for 1 h. After that, the powder was taken out of the reactor through filtration, washed with hexane, and dried overnight under reduced pressure at 80° C. to yield 113.9 g of a polymer. The properties of the polymer obtained were evaluated. The results are shown in Table 1.

Example 2

Polymerization was performed similarly to Example 1 to yield 85.4 g of a polymer. Here, 4 ml of 1-decene was added as a comonomer besides 400 ml of 4-methyl-1-pentene, and the polymerization temperature was 50° C. The properties of the polymer obtained were evaluated. The results are shown in Table 1.

Example 3

Prepolymerization on Solid Titanium Catalyst Component [A-1]

In a 200-ml four-necked glass reactor with a stirrer, in dry nitrogen stream, were charged 8.36 ml of dry decane and 1.66 ml of a decane solution (1.0 mol/l in terms of Al) of triethylaluminum. Here were added 26.5 ml of a decane slurry of solid titanium catalyst component [A-1] (containing solid titanium catalyst component [A-1] in an amount of 0.83 mmol in terms of Ti, or 1.1 g in terms of mass) and 4.98 ml (3.3 g) of 3-methyl-1-pentene. The mixture was stirred for 45 minutes while the temperature was kept at 20° C. to obtain prepolymerized catalyst [A-1], which contained 3 g of a polymer per gram of solid titanium catalyst component [A-1].
[Polymerization]

Polymerization was performed similarly to Example 2 except that prepolymerization catalyst [A-1] was used in place of solid titanium catalyst component [A-1] to yield 77.3 g of a polymer. The properties of the polymer obtained were evaluated. The results are shown in Table 1.

Example 4

Polymerization was performed similarly to Example 1, except that 0.0028 mmol (in terms of Ti) of solid titanium catalyst component [A-1] was used, 4 ml of 1-decene was added as a comonomer besides 400 ml of 4-methyl-1-pentene, 0.5 mmol of 2-methyl-2-n-propyl-1,3-diethoxypropane (MPEP) was further added, and the polymerization temperature was 50° C., to yield 54.6 g of a polymer. The properties of the polymer obtained were evaluated. The results are shown in Table 1.

Example 5

Polymerization was performed similarly to Example 1, except that 0.0036 mmol (in terms of Ti) of solid titanium catalyst component [A-1] was used, 4 ml of 1-decene was added as a comonomer besides 400 ml of 4-methyl-1-pentene, 0.5 mmol of cyclohexylmethyldimethoxysilane (CMMS) was further added, and the polymerization temperature was 50° C., to yield 57.1 g of a polymer. The properties of the polymer obtained were evaluated. The results are shown in Table 1.

Example 6

Preparation of Solid Titanium Catalyst Component [A-2]

Solid titanium catalyst component [A-2] was prepared similarly to Example 1 except that no 2-methyl-2-n-propyl-1,3-diethoxypropane (MPEP) was added after the heating to 110° C. in preparing solid titanium catalyst component [A-1] in Example 1. Solid titanium catalyst component [A-2] thus obtained contained 4.4 mass % of Ti, 18.0 mass % of Mg, 56 mass % of Cl, 9.5 mass % of 2,2-diethyl-1,3-diethoxypropane, and 1.8 mass % of 2-ethylhexyl alcohol residue.
[Polymerization]

Polymerization was performed similarly to Example 1, except that solid titanium catalyst component [A-2] was used, 4 ml of 1-decene was added as a comonomer besides 400 ml of 4-methyl-1-pentene, and the polymerization temperature was 50° C., to yield 87.7 g of a polymer. The properties of the polymer obtained were evaluated. The results are shown in Table 1.

Example 7

Preparation of Solid Titanium Catalyst Component [A-3]

Solid titanium catalyst component [A-3] was prepared similarly to Example 1 except that 18.5 g of 2,2-diethyl-1,3-diethoxypropane (DEEP) was used in place of 2-methyl-2-n-propyl-1,3-diethoxypropane (MPEP) and that 0.42 g of 2,2-diethyl-1,3-diethoxypropane was added after the heating to 110° C. in preparing solid titanium catalyst component [A-1] in Example 1. Solid titanium catalyst component [A-3] thus obtained contained 3.6 mass % of Ti, 19.0 mass % of Mg, 56 mass % of Cl, 8.9 mass % of 2,2-diethyl-1,3-diethoxypropane, and 1.7 mass % of 2-ethylhexyl alcohol residue.
[Polymerization]

Polymerization was performed similarly to Example 1 except that solid titanium catalyst component [A-3] was used in place of [A-1] to yield 90.4 g of a polymer. The properties of the polymer obtained were evaluated. The results are shown in Table 1.

Example 8

Polymerization was performed similarly to Example 1, except that solid titanium catalyst component [A-3] was used, 4 ml of 1-decene was added as a comonomer besides 400 ml of 4-methyl-1-pentene, and the polymerization temperature was 50° C., to yield 83.8 g of a polymer. The properties of the polymer obtained were evaluated. The results are shown in Table 1.

Example 9

Polymerization was performed similarly to Example 1, except that solid titanium catalyst component [A-3] was used, 4 ml of 1-decene was added as a comonomer besides 400 ml of 4-methyl-1-pentene, 0.05 mmol of cyclohexylmethyldimethoxysilane (CMMS) was further added as an organosilicon compound, and the polymerization temperature was 50° C., to yield 58.7 g of a polymer. The properties of the polymer obtained were evaluated. The results are shown in Table 1.

Example 10

Preparation of Solid Titanium Catalyst Component [A-4]

Solid titanium catalyst component [A-4] was prepared similarly to Example 1 except that 19.9 g of 2-methyl-2-n-butyl-1,3-diethoxypropane (BMEP) was used in place of 2-methyl-2-n-propyl-1,3-diethoxypropane (MPEP) and that 0.48 g of 2-methyl-2-n-butyl-1,3-diethoxypropane was used after the heating to 110° C. in preparing solid titanium catalyst component [A-1] in Example 1. Solid titanium catalyst component [A-4] contained 3.8 mass % of Ti, 18.0 mass % of Mg, 57 mass % of Cl, 11.6 mass % of 2-methyl-2-n-butyl-1,3-diethoxypropane, and 1.4 mass % of 2-ethylhexyl alcohol residue.
[Polymerization]

Polymerization was performed similarly to Example 1, except that solid titanium catalyst component [A-4] was used, 4 ml of 1-decene was added as a comonomer besides 400 ml of 4-methyl-1-pentene, and the polymerization temperature was 50° C., to yield 84 g of a polymer. The properties of the polymer obtained were evaluated. The results are shown in Table 1.

Example 11

Preparation of Solid Titanium Catalyst Component [A-5]

Solid titanium catalyst component [A-5] was prepared similarly to Example 1 except that 17.1 g of 2-methyl-2-n-propyl-1-methoxy-3-ethoxypropane (MPEMP) was used in place of 2-methyl-2-n-propyl-1,3-diethoxypropane (MPEP) and that 0.39 g of 2-methyl-2-n-propyl-1-methoxy-3-ethoxypropane was used after the heating to 110° C. in preparing solid titanium catalyst component [A-1] in Example 1. Solid titanium catalyst component [A-5] thus obtained contained 2.8 mass % of Ti, 18 mass % of Mg, 56 mass % of Cl, 13.1 mass % of 2-methyl-2-n-propyl-1-methoxy-3-ethoxypropane, and 1.2 mass % of 2-ethylhexyl alcohol residue.
[Polymerization]

Polymerization was performed similarly to Example 1, except that solid titanium catalyst component [A-5] was used, 4 ml of 1-decene was added as a comonomer besides 400 ml of 4-methyl-1-pentene, and the polymerization temperature was 50° C., to yield 57 g of a polymer. The properties of the polymer obtained were evaluated. The results are shown in Table 1.

Example 12

A 1-liter polymerization reactor was charged with 400 ml of heptane, 75 ml of hydrogen, 0.5 mmol of triethylaluminum, 0.05 mmol of cyclohexylmethyldimethoxysilane (CMMS), and 0.004 mmol (in terms of Ti) of solid titanium catalyst component [A-3] obtained in Example 3. Polymerization was performed for 1 h while inside of the reactor was kept at 70° C. and propylene was fed at a gauge pressure of 0.5 MPa. The powder was taken out of the reactor through filtration, washed with hexane, and dried overnight under reduced pressure at 80° C. to yield 55.6 g of a polymer. The properties of the polymer obtained were evaluated. The results are shown in Table 1.

Comparative Example 1

Preparation of Solid Titanium Catalyst Component [A-6]

Preparation of Solid Titanium Catalyst Component [A-6] was tried similarly to Example 6 except that 17.1 g of 2-methyl-2-ethyl-1,3-diethoxypropane (EMEP) was used in preparing solid titanium catalyst component [A-2] in Example 6. However, no solid titanium catalyst component was obtained, because the catalyst component was emulsified and isolation of solid by hot filtration was impossible.

Comparative Example 2

Preparation of Solid Titanium Catalyst Component [A-7]

Solid titanium catalyst component [A-7] was prepared similarly to Example 6 except that 22.7 g of 2-isobutyl-2-isopropyl-1,3-diethoxypropane (BPEP) was used in place of 2-methyl-2-n-propyl-1,3-diethoxypropane (MPEP) in preparing solid titanium catalyst component [A-2] in Example 6. Solid titanium catalyst component [A-7] thus obtained contained 5.3 mass % of Ti, 18.0 mass % of Mg, 57 mass % of Cl, 3.2 mass % of 2-methyl-2-n-propyl-1,3-diethoxypropane, and 1.4 mass % of 2-ethylhexyl alcohol residue.
[Polymerization]

Polymerization was performed similarly to Example 1 except that 0.004 mmol (in terms of Ti) of solid titanium catalyst component [A-7] was used to yield 102.4 g of a polymer. The properties of the polymer obtained were evaluated. The results are shown in Table 2.

Comparative Example 3

Polymerization was performed similarly to Example 1, except that 0.004 mmol (in terms of Ti) of solid titanium catalyst component [A-7] was used and 4 ml of 1-decene was added as a comonomer besides 400 ml of 4-methyl-1-pentene and the polymerization temperature was 50° C., to yield 83.2 g of a polymer. The properties of the polymer obtained were evaluated. The results are shown in Table 2.

Comparative Example 4

Preparation of Solid Titanium Catalyst Component [A-8]

Preparation of solid titanium catalyst component [A-8] was tried similarly to Example 6 except that 24.0 g of 2-isobutyl-2-isopentyl-1,3-diethoxypropane (BPNEP) was used in place of 2-methyl-2-n-propyl-1,3-diethoxypropane in preparing solid titanium catalyst component [A-2] in Example 6. However, no solid titanium catalyst component was obtained because the reaction system was emulsified and isolation of solid by hot filtration was impossible.

Comparative Example 5

Preparation of Solid Titanium Catalyst Component [A-9]

Solid titanium catalyst component [A-9] was prepared similarly to Example 6 except that 19.9 g of 2-isobutyl-2-isopropyl-1,3-dimetoxypropane (BPMP) was used in place of 2-methyl-2-n-propyl-1,3-diethoxypropane in preparing solid titanium catalyst component [A-2] in Example 6. Solid titanium catalyst component [A-9] thus obtained contained 4.1 mass % of Ti, 17.0 mass % of Mg, 57 mass % of Cl, 15.9 mass % of 2-isobutyl-2-isopropyl-1,3-dimethoxypropane, and 2.1 mass % of 2-ethylhexyl alcohol residue.
[Polymerization]

Polymerization was performed similarly to Example 1 except that 0.004 mmol (in terms of Ti) of solid titanium catalyst component [A-9] was used to yield 108.8 g of a polymer. The properties of the polymer obtained were evaluated. The results are shown in Table 2.

Comparative Example 6

Polymerization was performed similarly to Example 1, except that 0.004 mmol (in terms of Ti) of solid titanium catalyst component [A-9] was used, 4 ml of 1-decene was added as a comonomer besides 400 ml of 4-methyl-1-pentene, and the polymerization temperature was 50° C., to yield 99.8 g of a polymer. The properties of the polymer obtained were evaluated. The results are shown in Table 2.

TABLE 1

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| $C_3$ or higher olefin | α-olefin (1) | 4-Methyl-1-pentene | | | | | | | | | | | Propylene |
| | α-olefin (2) | — | 1-Decene | 1-Decene | 1-Decene | 1-Decene | 1-Decene | — | 1-Decene | 1-decene | 1-Decene | 1-Decene | — |
| Solid titanium catalyst component (I) | Designation | A-1 | A-1 | A-1 | A-1 | A-1 | A-2 | A-3 | A-3 | A-3 | A-4 | A-5 | A-3 |
| | Ether (general formula (1)) | MPEP | MPEP | MPEP | MPEP | MPEP | MPEP | DEEP | DEEP | DEEP | BMEP | MPEMP | DEEP |
| Main polymerization | Ether (general formula (3)) | — | — | — | MPEP | — | — | — | — | — | — | — | — |
| | Electron donor (IV) | — | — | — | — | CMMS | — | — | CMMS | — | — | — | CMMS |
| Catalytic activity (kg/mmol-Ti/hr) | | 71.2 | 53.4 | 48.3 | 19.5 | 15.9 | 54.8 | 56.5 | 52.4 | 36.7 | 52.5 | 35.6 | 13.9 |
| Polymer (white solid) | Apparent bulk density (kg/m³) | 340 | 350 | 360 | 410 | 410 | 330 | 390 | 350 | 380 | 350 | 300 | 390 |
| | MFR (g/10 min) | 0.12 | 0.23 | 0.24 | 0.07 | 0.23 | 0.33 | 0.01 | 0.3 | 0.36 | 0.05 | 0.22 | 13.5 |
| | Content of n-decane-soluble component (%) | 3.2 | 4.6 | 5.5 | 2.5 | 3.4 | 7.6 | 3.4 | 6.9 | 3.5 | 6.2 | 4.9 | 3.5 |
| | Content of structural units derived from α-olefin (2): $b_1$ (wt %) | — | 2.9 | 3.2 | 3.7 | 3.7 | 2.6 | — | 2.5 | 3.2 | 2.9 | 3.2 | — |
| Polymer content in filtrate (wt %) | | 1.4 | 2.3 | 1.2 | 0.7 | 0.9 | 2.6 | 1.9 | 3.5 | 2 | 4.8 | 3 | 1.26 |
| Tacticity (t-II) (wt %) | | 95.4 | 93.2 | 93.4 | 96.8 | 95.7 | 90.0 | 94.8 | 89.8 | 94.6 | 89.3 | 92.2 | 95.3 |
| Content of structural units derived from α-olefin (2) in n-decane-soluble component: $a_1$ (wt %) | | — | 7.6 | 8.2 | 11.3 | 11.8 | 6.5 | — | 6.4 | 9.4 | 7.0 | 8.1 | — |
| $a_1/b_1$ | | — | 2.6 | 2.6 | 3.1 | 3.2 | 2.5 | — | 2.6 | 2.9 | 2.4 | 2.5 | — |

TABLE 2

| | | Comparative Examples | | | | | |
|---|---|---|---|---|---|---|---|
| | | 1 | 2 | 3 | 4 | 5 | 6 |
| $C_3$ or higher olefin | α-olefin (1) | 4-Methyl-1-pentene | | | | | |
| | α-olefin (2) | — | — | 1-Decene | — | — | 1-Decene |
| Solid titanium catalyst component (I) | Designation | A-6 | A-7 | A-7 | A-8 | A-8 | A-9 |
| | Ether (general formula (1)) | EMEP | BPEP | BPEP | BPNEP | BPMP | BPMP |
| Main polymerization | Ether (general formula (3)) | — | — | — | — | — | — |
| | Electron donor (IV) | — | — | — | — | — | — |
| Catalytic activity (kg/mmol-Ti/hr) | | *1 | 25.6 | 20.8 | *1 | 27.2 | 25 |
| Polymer (white solid) | Apparent bulk density (kg/m³) | | 340 | 330 | | 380 | 360 |
| | MFR (g/10 min) | | 0.29 | 0.47 | | 0.15 | 0.25 |
| | Content of n-decane-soluble fraction (wt %) | | 14.7 | 19.7 | | 5.3 | 7.3 |
| | Content of structural units derived from α-olefin (2): $b_1$ (wt %) | | — | 2.4 | | — | 2.8 |
| Polymer content in filtrate (%) | | | 19 | 16.2 | | 5.1 | 6.4 |
| Tacticity (t-II) (%) | | | 69.1 | 67.3 | | 89.9 | 86.8 |
| Content of structural units derived from α-olefin (2) in n-decane-soluble component: $a_1$ (wt %) | | | — | 4.4 | | — | 5.3 |
| $a_1/b_1$ | | | — | 1.8 | | — | 1.9 |

*1 Solid titanium catalyst component is not obtained.

Example 13

Polymerization

At room temperature, a 290-liter polymerization reactor was charged with 84.2 kg of 4-methyl-1-pentene, 100 liters of hydrogen, and then triethylaluminum, 2-methyl-2-n-propyl-1,3-diethoxypropane (MPEP), and solid titanium catalyst component [A-1] on which 4 g of 3-methyl-1-pentene was prepolymerized per millimole of Ti. The polymerization was performed for 4 hours while the inside of the reactor was kept at 48° C. The reaction mixture was washed with 4-methyl-1-pentene/methanol mixture, the supernatant was removed, and the powder was isolated with a decanter to yield 21 kg of a polymer. The properties of the polymer obtained were evaluated. The results are shown in Table 3.

[Film Production]

Poly-4-methyl-1-pentene obtained above was mixed with a known neutralizing agent generally used for polyolefins and a phenolic anti-oxidant using a Henschel mixer, and the mixture was melt-kneaded at 290° C. with an extruder to obtain pellets. The pellets were formed into a 50-μm thick, 300-mm wide cast-film with a cast-film forming machine equipped with a T-die at a cylinder temperature of 310° C. and a chill-roll temperature of 60° C. The properties of the film obtained were evaluated. The results are shown in Table 3.

Example 14

Polymerization was performed similarly to Example 13 except that 0.9 kg of 1-decene was added as a comonomer besides 84.2 kg of 4-methyl-1-pentene to yield 16 kg of a polymer. The properties of the polymer obtained were evaluated. The results are shown in Table 3.

Example 15

Polymerization was performed similarly to Example 13 except that 0.9 kg of 1-decene was added as a comonomer besides 84.2 kg of 4-methyl-1-pentene and that cyclohexylmethyldimethoxysilane (CMMS) was added in place of 2-methyl-2-n-propyl-1,3-diethoxypropane (MPEP) to yield 22.4 kg of a polymer. The properties of the polymer obtained were evaluated. The results are shown in Table 3.

Example 16

Polymerization was performed similarly to Example 13, except that solid titanium catalyst component [A-1] was changed to [A-3], 0.9 kg of 1-decene was added as a comonomer besides 84.2 kg of 4-methyl-1-pentene, and cyclohexylmethyldimethoxysilane (CMMS) was added in place of 2-methyl-2-n-propyl-1,3-diethoxypropane (MPEP), to yield 24.8 kg of a polymer. The properties of the polymer obtained were evaluated. The results are shown in Table 4.

Example 17

Polymerization was performed similarly to Example 13, except that 3.0 kg of an equi-mass mixture of 1-hexadecene and 1-octadecene was added as comonomers besides 84.2 kg of 4-methyl-1-pentene, the polymerization temperature was 33° C., and no 2-methyl-2-n-propyl-1,3-diethoxypropane (MPEP) was added, to yield 8.1 kg of a polymer. The properties of the polymer obtained were evaluated. The results are shown in Table 4.

Example 18

Polymerization was performed similarly to Example 13, except that 3.0 kg of an equi-mass mixture of 1-hexadecene and 1-octadecene was added as comonomers besides 84.2 kg of 4-methyl-1-pentene, and the polymerization temperature was 33° C., to yield 7.9 kg of a polymer. The properties of the polymer obtained were evaluated. The results are shown in Table 4.

Example 19

Polymerization was performed similarly to Example 13, except that 3.0 kg of an equi-mass mixture of 1-hexadecene and 1-octadecene was added as comonomers besides 84.2 kg of 4-methyl-1-pentene, the polymerization temperature was 33° C., and cyclohexylmethyldimethoxysilane (CMMS) was added in place of 2-methyl-2-n-propyl-1,3-diethoxypropane (MPEP), to yield 10.5 kg of a polymer. The properties of the polymer obtained were evaluated. The results are shown in Table 4.

Example 20

Polymerization was performed similarly to Example 13, except that solid titanium catalyst component [A-1] was changed to [A-3], 3.0 kg of an equi-mass mixture of 1-hexadecene and 1-octadecene was added as comonomers besides 84.2 kg of 4-methyl-1-pentene, the polymerization temperature was 33° C., and cyclohexylmethyldimethoxysilane (CMMS) was added in place of 2-methyl-2-n-propyl-1,3-diethoxypropane (MPEP), to yield 9.6 kg of a polymer. The properties of the polymer obtained were evaluated. The results are shown in Table 4.

Comparative Example 7

Polymerization was performed similarly to Example 13, except that solid titanium catalyst component [A-9] was used, 0.9 kg of 1-decene was added as a comonomer besides 84.2 kg of 4-methyl-1-pentene, and no 2-methyl-2-n-propyl-1,3-diethoxypropane (MPEP) was used, to yield 15.6 kg of a polymer. The properties of the polymer obtained were evaluated. The results are shown in Table 3.

Comparative Example 8

Polymerization was performed similarly to Example 13, except that 0.9 kg of 1-decene was charged as a comonomer besides 84.2 kg of 4-methyl-1-pentene, titanium trichloride (TAC-131, Toho Titanium) and diethylaluminum chloride were used in place of solid titanium catalyst component [A-1], and no 2-methyl-2-n-propyl-1,3-diethoxypropane (MPEP) was usedm to yield 18.4 kg of a polymer. The properties of the polymer obtained were evaluated. The results are shown in Table 3.

Comparative Example 9

Polymerization was performed similarly to Example 13, except that solid titanium catalyst component [A-9] was used, 3.0 kg of an equi-mass mixture of 1-hexadecene and 1-octadecene was added as comonomers besides 84.2 kg of 4-methyl-1-pentene, and the polymerization temperature was 33° C., and no 2-methyl-2-n-propyl-1,3-diethoxypropane (MPEP) was used, to yield 5.3 kg of a polymer. The properties of the polymer obtained were evaluated. The results are, shown in Table 4.

Comparative Example 10

Polymerization was performed similarly to Example 13, except that 3.0 kg of an equi-mass mixture of 1-hexadecene and 1-octadecene was used as comonomers besides 84.2 kg of 4-methyl-1-pentene, titanium trichloride (TAC-131, Toho Titanium) and diethylaluminum chloride were used in place of solid titanium catalyst component [A-1], and no 2-methyl-2-n-propyl-1,3-diethoxypropane (MPEP) was used, to yield 5.8 kg of a polymer. The properties of the polymer obtained were evaluated. The results are shown in Table 4.

TABLE 3

|  |  | Examples | | | | Comparative Examples | |
|---|---|---|---|---|---|---|---|
|  |  | 13 | 14 | 15 | 16 | 7 | 8 |
| $C_3$ or higher olefin | α-olefin (1) | 4-Methyl-1-pentene | | | | | |
|  | α-olefin (2) | — | 1-Decene | 1-Decene | 1-Decene | 1-Decene | 1-Decene |
| Solid titanium catalyst component(I) | Designation | A-1 | A-1 | A-1 | A-3 | A-9 | TAC-131 |
|  | Ether (general formula (1)) | MPEP | MPEP | MPEP | DEEP | BPMP | — |
| Main polymerization | Ether (general formula (3)) | MPEP | MPEP | — | — | — | — |
|  | Electron donor (IV) | — | — | CMMS | CMMS | — | — |
| Polymer (white solid) | Apparent bulk density (kg/m$^3$) | 440 | 430 | 440 | 450 | 430 | 390 |
|  | MFR (g/10 min) | 5.4 | 0.43 | 0.27 | 0.44 | 0.82 | 0.72 |
|  | Melting point (Tm) (° C.) | 240.0 | 232.0 | 232.0 | 232.0 | 233.0 | 234 |
|  | Molecular weight distribution (Mw/Mn) | 10.8 | 12.0 | 11.8 | 12.7 | 11.2 | 26.1 |
|  | Content of n-decane-soluble component (wt %) | 1.9 | 1.1 | 2.4 | 2.3 | 7.3 | 3.1 |
|  | Content of structural units derived from α-olefin (2): $b_1$ (wt %) | — | 3.2 | 3.1 | 3.0 | 3.2 | 3.2 |
| Amount of polymer in filtrate (wt %) | | 0 | 0.9 | 0.8 | 0.1 | 3.7 | 0.7 |
| Tacticity (t-II) (wt %) | | 98.1 | 98.4 | 96.8 | 97.6 | 93.8 | 96.2 |
| Content of structural units derived from α-olefin (2) in n-decane-soluble component: $a_1$ (wt %) | | — | 9.8 | 9.8 | 8.7 | 5.9 | 6.2 |
| Content of structural units derived from α-olefin (2) in n-decane-soluble component: $d_1$ (mol %) | | — | 6.1 | 6.1 | 5.4 | 3.6 | 3.8 |
| $a_1/b_1$ | | — | 3.1 | 3.2 | 2.9 | 1.8 | 1.9 |
| Mechanical Property (Toughness) | Tensile elongation at break (%) | 2 | 31 | 28 | 27 | 30 | 29 |
| Film | Blocking factor $c_1$ (g/cm) | 2.0 | 3.2 | 3.9 | 3.7 | 6.8 | 5.9 |
| $c_1/d_1$ | | — | 0.5 | 0.6 | 0.7 | 1.9 | 1.6 |

TABLE 4

|  |  | Examples | | | | Comparative Examples | |
|---|---|---|---|---|---|---|---|
|  |  | 17 | 18 | 19 | 20 | 9 | 10 |
| $C_3$ or higher olefin | α-olefin (1) | 4-Methyl-1-pentene | | | | | |
|  | α-olefin (2) | 1-Hexadecene/1-octadecene mixture | | | | | |
| Solid titanium catalyst component(I) | Designation | A-1 | A-1 | A-1 | A-3 | A-9 | TAC-131 |
|  | Ether (general formula (1)) | MPEP | MPEP | MPEP | DEEP | BPMP | — |
| Main polymerization | Ether (general formula (3)) | — | MPEP | — | — | — | — |
|  | Electron donor (IV) | — | — | CMMS | CMMS | — | — |
| Polymer (white solid) | Apparent bulk density (kg/m$^3$) | 430 | 430 | 430 | 440 | 420 | 380 |
|  | MFR (g/10 min) | 3.6 | 3.4 | 2.7 | 4.7 | 8.8 | 7.8 |
|  | Melting point (Tm) (° C.) | 227.0 | 228.0 | 228.0 | 228.0 | 229.0 | 227 |
|  | Molecular weight distribution (Mw/Mn) | 25.4 | 25.3 | 25.5 | 25.1 | 10.2 | 27.3 |
|  | Content of n-decane-soluble fraction (wt %) | 14.6 | 12.6 | 12.2 | 14.0 | 18.5 | 10.8 |
|  | Content of structural units derived from α-olefin (2): $b_2$ (wt %) | 3.7 | 3.9 | 3.9 | 3.7 | 4.0 | 4.0 |
| Polymer content in filtrate (wt %) | | 5.9 | 1.1 | 2.5 | 1.6 | 5.7 | 3.9 |
| Tacticity (t-II) (wt %) | | 79.5 | 86.3 | 85.3 | 84.4 | 79.3 | 85.3 |
| Content of structural units derived from α-olefin (2) in n-decane-soluble component: $a_2$ (wt %) | | 16.0 | 20.4 | 20.4 | 18.5 | 10.3 | 10.6 |
| Content of structural units derived from α-olefin (2) in n-decane-soluble component: $d_2$ (mol %) | | 6.3 | 8.3 | 8.3 | 7.4 | 3.9 | 4.0 |
| $a_2/b_2$ | | 4.3 | 5.2 | 5.2 | 5.0 | 2.6 | 2.7 |
| Mechanical Property (Toughness) | Tensile elongation at break (%) | 58 | 56 | 57 | 65 | 50 | 48 |
| Film | Blocking factor $c_2$ (g/cm) | 4.6 | 4.2 | 6.8 | 5.0 | 8.0 | 6.9 |
| $c_2/d_2$ | | 0.7 | 0.5 | 0.8 | 0.7 | 2.1 | 1.7 |

INDUSTRIAL APPLICABILITY

The present invention can provides a highly active polymerization catalyst for producing a polymer of a $C_3$ or higher α-olefin with more excellent tacticity and crystallinity, and a process for producing the α-olefin polymer, having outstanding industrial value.

The invention claimed is:

1. A film obtained by forming a copolymer containing 92 to 98 mass % of structural units derived from 4-methyl-1-pentene and 2 to 8 mass % of structural units derived from at least one selected from the group consisting of 1-dodecene, 1-tetradecene, 1-hexadecene and 1-octadecene, wherein the ratio $c_2/d_2$ is in the range of 0.1 to 1.5, wherein $c_2$ represents the blocking factor in g/cm of the film, and $d_2$ represents the content in mol % of structural units derived from the at least one selected from the group consisting of 1-dodecene, 1-tetradecene, 1-hexadecene and 1-octadecene in the n-decane-soluble component of the copolymer.

2. A release film made of the film according to claim 1.

* * * * *